(12) United States Patent
Park et al.

(10) Patent No.: US 12,279,257 B1
(45) Date of Patent: *Apr. 15, 2025

(54) METHOD AND APPARATUS FOR GRANT-FREE DATA TRANSMISSION IN WIRELESS COMMUNICATION SYSTEM

(71) Applicant: Samsung Electronics Co., Ltd., Suwon-si (KR)

(72) Inventors: Sungjin Park, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/428,439

(22) Filed: Jan. 31, 2024

Related U.S. Application Data

(63) Continuation of application No. 18/346,519, filed on Jul. 3, 2023, now Pat. No. 12,120,707, which is a
(Continued)

(51) Int. Cl.
*H04W 72/23* (2023.01)
*H04L 1/00* (2006.01)
(Continued)

(52) U.S. Cl.
CPC ....... *H04W 72/1273* (2013.01); *H04L 1/0003* (2013.01); *H04L 1/1812* (2013.01); *H04W 72/11* (2023.01); *H04W 72/232* (2023.01)

(58) Field of Classification Search
CPC ............. H04W 72/044; H04W 72/042; H04W 28/18; H04W 72/1289; H04W 72/1273;
(Continued)

(56) References Cited

U.S. PATENT DOCUMENTS

2018/0034610 A1  2/2018 He et al.
2020/0313809 A1  10/2020 Park et al.
(Continued)

FOREIGN PATENT DOCUMENTS

CN       110149173 A    8/2019
KR   10-2019-0028352 A    3/2019
(Continued)

OTHER PUBLICATIONS

Indian Office Action dated Feb. 2, 2024, issued in Indian Patent Application No. 202127044318.
(Continued)

*Primary Examiner* — Jung Liu
(74) *Attorney, Agent, or Firm* — Jefferson IP Law, LLP

(57) ABSTRACT

A communication scheme and a system of converging an IoT technology and a $5^{th}$ generation (5G) communication system for supporting a higher data transfer rate beyond a $4^{th}$ generation (4G) system are provided. The communication scheme includes intelligent services (e.g. smart home, smart building, smart city, smart car or connected car, health care, digital education, retail business, and security and safety-related services), based on a 5G communication technology and an IoT-related technology. A method performed by a terminal in a communication system is provided. The method includes receiving, from a base station, a semi-persistent scheduling (SPS) configuration including an SPS configuration index; identifying at least one physical downlink shared channel (PDSCH) corresponding to the SPS configuration; identifying a PDSCH with a lowest SPS configuration index in case that the at least one PDSCH corresponding to the SPS configuration is overlapped in time in a slot; determining a PDSCH for data transmission based on excluding a PDSCH that is overlapped with the PDSCH with the lowest SPS configuration index from the at least one
(Continued)

PDSCH; and receiving, from the base station, data based on the determined PDSCH, wherein the at least one PDSCH is not overlapped with a symbol indicated as an uplink in the slot.

16 Claims, 13 Drawing Sheets

Related U.S. Application Data continuation of application No. 17/101,321, filed on Nov. 23, 2020, now Pat. No. 11,696,295.

(60) Provisional application No. 62/939,294, filed on Nov. 22, 2019.

(51) Int. Cl.
*H04L 1/1812* (2023.01)
*H04W 72/11* (2023.01)
*H04W 72/1273* (2023.01)
*H04W 72/232* (2023.01)

(58) Field of Classification Search
CPC .............. H04W 76/30; H04W 72/0493; H04L 5/0053; H04L 1/1812; H04L 1/1614; H04L 1/1854; H04L 1/1893; H04L 1/1887; H04L 1/1819; H04L 5/0055; H04L 1/1896; H04L 1/1664; H04B 7/0456
See application file for complete search history.

(56) References Cited

U.S. PATENT DOCUMENTS

| | | | | |
|---|---|---|---|---|
| 2020/0358487 | A1* | 11/2020 | Yang | ............... H04L 1/1819 |
| 2020/0374048 | A1* | 11/2020 | Lei | .................. H04L 1/1896 |
| 2021/0007088 | A1* | 1/2021 | Zhou | ............... H04W 72/044 |
| 2021/0153204 | A1 | 5/2021 | Takeda et al. | |
| 2021/0160829 | A1* | 5/2021 | Park | ................. H04L 1/1854 |
| 2022/0061074 | A1* | 2/2022 | Babaei | .............. H04L 5/0053 |

FOREIGN PATENT DOCUMENTS

| | | | |
|---|---|---|---|
| KR | 10-2020-0116392 A | 10/2020 | |
| WO | 2019/165176 A1 | 8/2019 | |
| WO | 2019/193700 A1 | 10/2019 | |

OTHER PUBLICATIONS

U.S. Notice of Allowance dated May 15, 2024, issued in U.S. Appl. No. 18/346,519.
Extended European Search Report dated Jun. 3, 2024, issued in European Patent Application No. 24162753.8.
Chinese Office Action dated Jun. 25, 2024, issued in Chinese Patent Application No. 202080026311.9.
International Search Report dated Feb. 24, 2021, issued in an International Application No. PCT/KR2020/016615.
Wilus Inc., 'Remaining Issues on SPS PDSCH for NR URLLC', R1-1913071, 3GPP TSG RAN WG1 #99, Nov. 9, 2019, Reno, USA, Sections 1-3.
Intel Corporation, 'Enhancements to DL SPS', R1-1912220, 3GPP TSG RAN WG1 #99, Nov. 9, 2019, Reno, USA, Section 3.1.
Wilus Inc., 'On SPS PDSCH for NR URLLC', R1-1911320, 3GPP TSG RAN WG1 #98bis, Oct. 8, 2019, Chongqing, China, Sections 1-3.
Extended European Search Report dated Apr. 7, 2022, issued in a counterpart European Application No. 20890657.8.
VIVO: "Other issues for URLLC and LIE features", 3GPP Draft; R1-1912037, 3rd Generation Partnership Project (3GPP), Mobile Competence Centre ; 650, Route Des Lucioles ; F-06921 Sophia-Antipolis Cedex ; France, RAN WG1, XP051823169; Nov. 9, 2019, Reno, USA.
NTT Docomo et al: "Discussions on DL SPS enhancement", 3GPP Draft; R1-1912891,3rd Generation Partnership Project (3GPP), Mobile Competence Centre ; 650, Route Des Lucioles ; F-06921 Sophia-Antipolis Cedex ; France, RAN WG1, XP051823670; Nov. 9, 2019, Reno, USA, pp. 1-9.
Nokia et al., IIoT WI: Resource conflicts between UL grants, HARQ-ACK and activation/release aspects for SPS, 3GPP TSG RAN WG1 Meeting #99, 3GPP, R1-1912609, Nov. 18, 2019.
LG Electronics, Summary#6 of 7.2.6.7 Others, 3GPP TSG RAN WG1 #98bis, 3GPP, R1-1911694, Oct. 20, 2019.
Japanese Office Action dated Aug. 13, 2024, issued in Japanese Patent Application No. 2021-559592.

* cited by examiner

METHOD AND APPARATUS FOR GRANT-FREE DATA TRANSMISSION IN WIRELESS COMMUNICATION SYSTEM

CROSS-REFERENCE TO RELATED APPLICATION(S)

This application is a continuation application of prior application Ser. No. 18/346,519 filed on Jul. 3, 2023; which is a continuation application of prior application Ser. No. 17/101,321 filed on Nov. 23, 2020, which has issued as U.S. Pat. No. 11,696,295 on Jul. 4, 2023; and which is based on and claims priority under 35 U.S.C § 119 (e) of a U.S. Provisional application Ser. No. 62/939,294 filed on Nov. 22, 2019 in the U.S. Patent and Trademark Office, the disclosure of each which is incorporated by reference herein in its entirety.

BACKGROUND

1. Field

The disclosure relates to a method and an apparatus for grant-free transmission and reception of data in a wireless communication system. More particularly, the disclosure relates to a method for grant-free transmission of data in the downlink.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "Beyond 4G Network" or a "Post long term evolution (LTE) System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

A 5G communication system is being developed to provide various services. As the system provides various services, a method for efficiently providing the services is required. Accordingly, active studies on grant-free communication are underway.

The above information is presented as background information only to assist with an understanding of the disclosure. No determination has been made, and no assertion is made, as to whether any of the above might be applicable as prior art with regard to the disclosure.

SUMMARY

The disclosure illustrates an embodiment in which grant-free data transmission or reception is performed to efficiently use wireless resources. Aspects of the disclosure are to address at least the above-mentioned problems and/or disadvantages and to provide at least the advantages described below. Accordingly, an aspect of the disclosure is to provide a method in which, when time resources for grant-free data transmission overlap with each other, a terminal receives data grant-freely.

Another aspect of the disclosure is to provide a method performed by a terminal in a communication system, the method comprising receiving, from a base station, a semi-persistent scheduling (SPS) configuration including an SPS configuration index, identifying whether at least one physical downlink shared channel (PDSCH) corresponding to the SPS configuration, identifying a PDSCH with a lowest SPS configuration index in case that the at least one PDSCH corresponding to the SPS configuration is overlapped in time in a slot, determining a PDSCH for data transmission based on excluding a PDSCH that is overlapped with the PDSCH with the lowest SPS configuration index from the at least one PDSCH, and receiving, from the base station, data based on the determined PDSCH, wherein the at least one PDSCH is not overlapped with a symbol indicated as an uplink in the slot.

Additional aspects will be set forth in part in the description which follows and, in part, will be apparent from the description, or may be learned by practice of the presented embodiments.

In accordance with an aspect of the disclosure, a method performed by a base station in a communication system is provided. The method includes transmitting, to a terminal, a semi-persistent scheduling (SPS) configuration including an SPS configuration index, and receiving, from the terminal, data based on a physical downlink shared channel (PDSCH) for data transmission, wherein the PDSCH for data transmission includes a PDSCH with a lowest SPS configuration index, wherein a PDSCH that is overlapped with the PDSCH with the lowest SPS configuration index is excluded from at least one PDSCH corresponding to the SPS configuration, and wherein the at least one PDSCH is not overlapped with a symbol indicated as an uplink in the slot.

In accordance with another aspect of the disclosure, a terminal in a communication system is provided. The terminal includes a transceiver, and a controller coupled with the transceiver and configured to, receive, from a base station, a semi-persistent scheduling (SPS) configuration including an SPS configuration index, identify whether at least one physical downlink shared channel (PDSCH) corresponding to the SPS configuration, identify a PDSCH with a lowest SPS configuration index in case that the at least one PDSCH corresponding to the SPS configuration is overlapped in time in a slot, determine a PDSCH for data transmission based on excluding a PDSCH that is overlapped with the PDSCH with the lowest SPS configuration index from the at least one PDSCH, and receive, from the base station, data based on the determined PDSCH, wherein the at least one PDSCH is not overlapped with a symbol indicated as an uplink in the slot.

In accordance with another aspect of the disclosure, a base station in a communication system is provided. The base station includes a transceiver, and a controller coupled with the transceiver and configured to, transmit, to a terminal, a semi-persistent scheduling (SPS) configuration including an SPS configuration index, and receive, from the terminal, data based on a physical downlink shared channel (PDSCH) for data transmission, wherein the PDSCH for data transmission includes a PDSCH with a lowest SPS configuration index, wherein a PDSCH that is overlapped with the PDSCH with the lowest SPS configuration index is excluded from at least one PDSCH corresponding to the SPS configuration, and wherein the at least one PDSCH is not overlapped with a symbol indicated as an uplink in the slot.

According to an embodiment, in grant-free data transmission, wireless resources can be efficiently used, and various services can be efficiently provided to a user according to priority.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
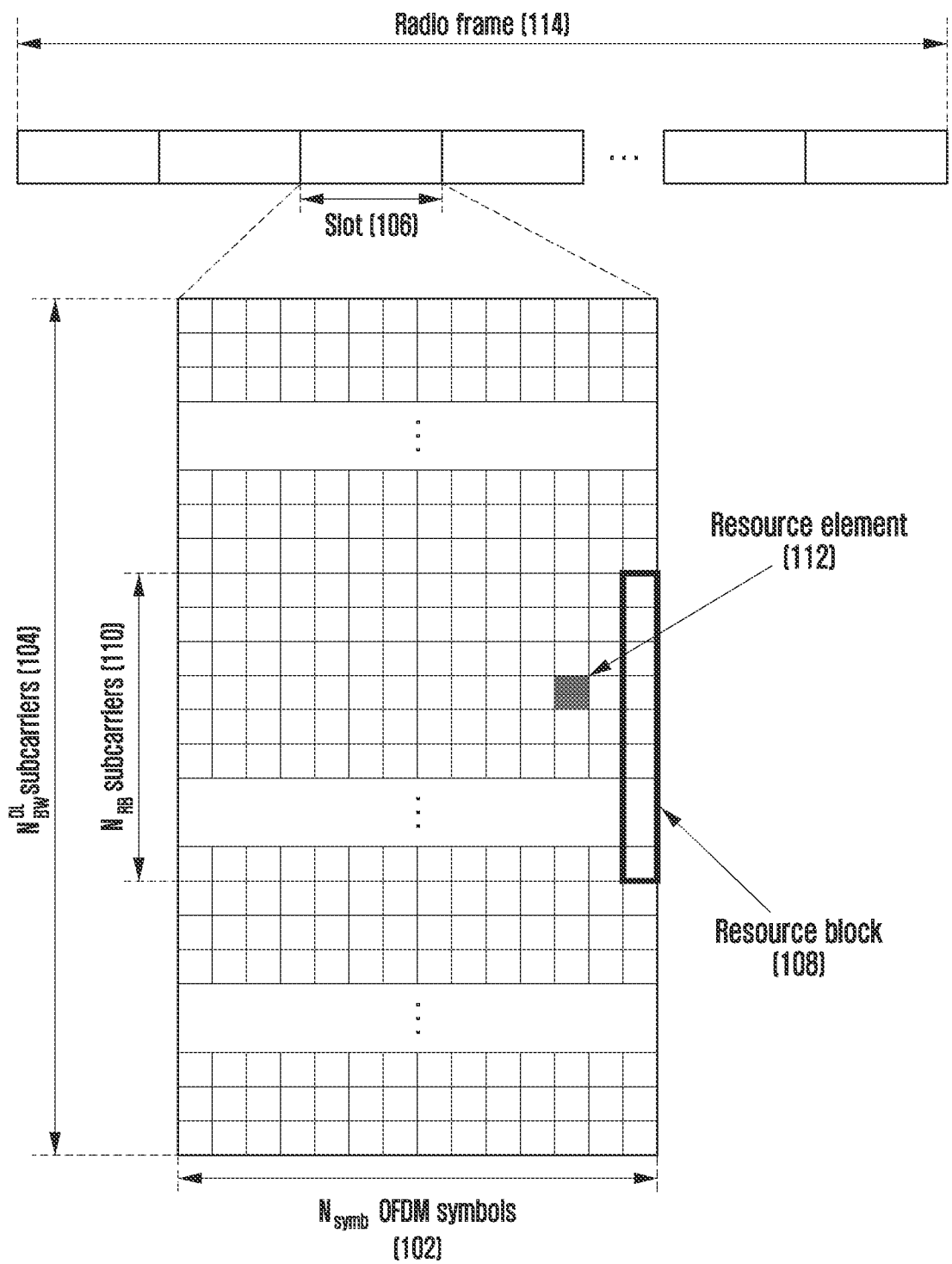
FIG. 1 is a diagram illustrating a transmission structure in a time-frequency domain that is a wireless resource region of a 5th generation (5G) or new radio (NR) system according to an embodiment of the disclosure.

The following description with reference to the accompanying drawings provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

A wireless communication system has developed to be a broadband wireless communication system that provides a high speed and high quality packet data service, like the communication standards, for example, high speed packet access (HSPA), long term evolution (LTE or evolved universal terrestrial radio access (E-UTRA)), and LTE-advanced (LTE-A) of 3GPP, high rate packet data (HRPD), and ultra mobile broadband (UMB) of 3GPP2, 802.16e of IEEE, and the like, beyond the voice-based service provided at the initial stage. In addition, a communication standard for 5G or new radio (NR) has been made for a 5th generation (5G) wireless communication system.

A 5G or NR system, which is a representative example of a broadband wireless communication system, employs an orthogonal frequency division multiplexing (OFDM) scheme for the downlink (DL) and uplink (UL). More specifically, a cyclic-prefix OFDM (CP-OFDM) scheme is employed for the downlink, and a discrete Fourier transform spreading OFDM (DFT-S-OFDM) scheme is employed for the uplink together with CP-OFDM. The uplink implies a wireless link through which a terminal transmits data or a control signal to a base station, and the downlink implies a wireless link through which a base station transmits data or a control signal to a terminal. In the multiple access schemes described above, time-frequency resources for carrying data or control information may be allocated and managed in a manner to prevent overlapping of the resources between users, i.e. to establish the orthogonality, so as to distinguish data or control information between the users.

The 5G or NR system employs a hybrid automatic repeat request (HARQ) scheme for, when a decoding failure has occurred in an initial transmission, retransmitting corresponding data in a physical layer. The HARQ scheme means that if a receiver fails to correctly decode data, the receiver transmits information (negative acknowledgement; NACK) notifying of a decoding failure to a transmitter, so as to allow the transmitter to retransmit corresponding data in a physical layer. The receiver combines the data retransmitted by the transmitter with the data previously failed to be decoded, to improve data reception performance. Furthermore, if the receiver correctly decodes data, the receiver may transmit information (acknowledgement, ACK) notifying of a decoding success to the transmitter, so as to allow the transmitter to transmit new data.

Meanwhile, a new radio access technology (NR) system, which is a new 5G communication, is designed to allow various services to be freely multiplexed in time and frequency resources, and accordingly, waveform, numerology, reference signals, etc. may be dynamically or freely allocated according to the needs of a corresponding service. The types of services supported in the 5G or NR system may be divided into categories, such as enhanced mobile broadband (eMBB), massive machine type communications (mMTC), and ultra-reliable and low-latency communications (URLLC). eMBB is a service aiming for high-speed transmission of a large amount of data, mMTC is a service aiming for terminal power minimization and access by multiple terminals, and URLLC is a service aiming for high reliability and low latency. Different requirements may be applied according to the type of a service applied to a terminal.

In the disclosure, the terms are defined in consideration of the functions, and the meaning of the terms may vary according to the intention of a user or operator, convention, or the like. Therefore, the definitions of the terms should be made based on the contents throughout the specification. Hereinafter, a base station is a subject configured to perform resource allocation to a terminal, and may be one of a gNode B (gNB), an eNode B (eNB), a Node B, a base station (BS), a wireless access unit, a base station controller, or a node on a network. A terminal may include a user equipment (UE), a mobile station (MS), a cellular phone, a smartphone, a computer, or a multimedia system capable of a communication function. Hereinafter, an NR system is explained as an example in the disclosure. However, the disclosure is not limited thereto, and embodiments can be also applied to various communication systems having similar technical backgrounds or channel types. In addition, an embodiment may be also applied to another communication system through partial modification without departing too far from the scope of the disclosure according to the determination of a person who skilled in the art.

In the disclosure, the used terms "physical channel" and "signal" may be used together with data or a control signal. For example, a PDSCH is a physical channel through which data is transmitted, but may be called data in the disclosure. That is, PDSCH transmission or reception may be understood as data transmission or reception.

In the disclosure, higher signaling (or may be used together with a higher signal, a higher layer signal, or a higher layer signaling) is a signal transfer method in which a signal is transferred to a terminal by a base station by using a physical layer downlink data channel, or is transferred to a base station by a terminal by using a physical layer uplink data channel. The higher signaling may be referred to as RRC signaling or a medium access control (MAC) control element (CE).

Recently, as studies on a 5G communication system are conducted, various methods for scheduling communication with a terminal are discussed. Accordingly, a method for efficiently scheduling and data transmission or reception in consideration of the characteristics of the 5G communication system is required. Therefore, in order to provide a user with multiple services in a communication system, a method for providing the respective services in the same time interval according to the characteristics thereof, and an apparatus using the same method are required.

A terminal is required to receive separate control information from a base station so as to transmit or receive data to or from the base station. However, in a case of periodically generated traffic or the type of a service requiring low latency and/or high reliability, it may be possible to transmit or receive data without the separate control information. This transmission scheme is called a configured grant (may be used together with grant-free or configured scheduling)-based data transmission method in the disclosure. A method for, after receiving data transmission resource configuration and relevant information configured through control information, receiving or transmitting data is called a first signal transmission/reception type. A method for transmitting or receiving data, based on previously configured information without control information is called a second signal transmission/reception type. For the second signal transmission/reception type, a previously configured resource region periodically exists. These regions may be configured by a uplink (UL) type 1 grant, which is a method in which only a higher signal is used, and a uplink (UL) type 2 grant (or semi-persistent scheduling (SPS)) in which a combination of a higher signal and a L1 signal (i.e. downlink control information; DCI) is used. In a case of the UL type 2 grant (or SPS), a part of information is determined based on a higher signal, and the remaining information, such as whether data is actually transmitted, is determined based on a L1 signal. The L1 signal may be generally classified into a signal indicating activation of resources configured through higher signaling and a signaling indicating release of the activated resources.

The disclosure includes a method for, in a case where a DL SPS transmission period has aperiodicity or is smaller than one slot, determining a semi-static hybrid automatic repeat request acknowledgement (HARQ-ACK) codebook and a dynamic HARQ-ACK codebook corresponding to the case, and a method for transmitting HARQ-ACK information corresponding thereto.

FIG. 1 is a diagram illustrating a transmission structure in a time-frequency domain that is a wireless resource region of a 5G or NR system according to an embodiment of the disclosure.

Referring to FIG. 1, in the wireless resource region, the horizontal axis indicates a time domain and the vertical axis indicates a frequency domain. In the time domain, the minimum transmission unit is an OFDM symbol, and $N_{symb}$ number of OFDM symbols 102 constitute one slot 106. The length of a subframe may be defined as 1.0 ms, and the length of a radio frame 114 may be defined as 10 ms. In the frequency domain, the minimum transmission unit is a subcarrier, and the bandwidth of the entire system transmission band may be configured by a total of $N_{BW}$ subcarriers 104. However, the above specific numerical values may be variably applied according to a system.

In the time-frequency resource region, the basic unit is a resource element (RE) 112, which may be represented by an OFDM symbol index and a subcarrier index. A resource block (RB) 108 may be defined as $N_{RB}$ number of consecutive subcarriers 110 in the frequency domain.

Generally, the minimum transmission unit of data is the RB unit. Generally, in a 5G or NR system, $N_{symb}$ may be equal to 14, $N_{RB}$ may be equal to 12, and $N_{BW}$ may be proportional to the bandwidth of the system transmission band. A data rate increases in proportion to the number of RBs scheduled to a terminal. In the 5G or NR system, in a case of an FDD system operating the uplink and the downlink by distinguishing them according to frequency, a downlink transmission bandwidth and an uplink transmission bandwidth may be different from each other. A channel bandwidth indicates an RF bandwidth corresponding to the system transmission bandwidth. Table 1 below shows the correlation between a channel bandwidth and a system transmission bandwidth defined in an LTE system, which is 4th generation wireless communication before a 5G or NR system. For example, an LTE system having a 10 MHz channel bandwidth has a transmission bandwidth configured by 50 RBs.

TABLE 1

| Channel bandwidth ($BW_{Channel}$) [MHz] | 1.4 | 3 | 5 | 10 | 15 | 20 |
|---|---|---|---|---|---|---|
| Transmission bandwidth configuration [$N_{RB}$] | 6 | 15 | 25 | 50 | 75 | 100 |

A 5G or NR system may employ a wider channel bandwidth than the channel bandwidths of LTE present in Table 1. Table 2 shows the correlation between a system transmission bandwidth, a channel bandwidth, and subcarrier spacing (SCS) in a 5G or NR system.

TABLE 2

|  | SCS [kHz] | Channel bandwidth ($BW_{Channel}$) [MHz] | | | | | | | | |
| --- | --- | --- | --- | --- | --- | --- | --- | --- | --- | --- |
|  |  | 5 | 10 | 15 | 20 | 25 | 40 | 50 | 60 | 80 | 100 |
| Maximum | 15 | 25 | 52 | 79 | 106 | 133 | 216 | 270 | N.A. | N.A. | N.A. |
| Transmission | 30 | 11 | 24 | 38 | 51 | 65 | 106 | 133 | 162 | 217 | 273 |
| bandwidth [$N_{RB}$] | 60 | N.A. | 11 | 18 | 24 | 31 | 51 | 65 | 79 | 107 | 135 |

In a 5G or NR system, scheduling information of downlink data or uplink data is transferred from a base station to a terminal through downlink control information (DCI). DCI is defined according to various formats, and each of formats may represent whether the DCI is scheduling information (UL grant) of uplink data or scheduling information (DL grant) of downlink data, whether the control information is compact DCI, which has a small size, whether spatial multiplexing using multiple antennas is applied, whether the DCI is used for power control, etc. For example, DCI format 1_1, which is scheduling information (DL grant) of downlink data, may include at least one of the pieces of control information described below.

Carrier indicator: indicating a frequency carrier on which transmission is performed.

DCI format indicator: distinguishing whether corresponding DCI is used for the downlink or uplink.

Bandwidth part (hereinafter, BWP) indicator: indicating a BWP in which transmission is performed.

Frequency domain resource allocation: indicating an RB in the frequency domain, which is allocated for data transmission. A represented resource is determined according to the system bandwidth and a resource allocation method.

Time domain resource allocation: indicating a slot and an OFDM symbol of the slot, on which a data-related channel is to be transmitted.

VRB-to-PRB mapping: indicating a method by which a virtual RB (hereinafter, VRB) index and a physical RB (hereinafter, PRB) index are to be mapped.

Modulation and coding scheme (hereinafter, MCS): indicating a modulation scheme and a coding rate which are used for data transmission. That is, the modulation and coding scheme may indicate a coding rate value capable of notifying of channel coding information and a transport block size (TBS) together with information relating to whether the modulation scheme corresponds to quadrature phase shift keying (QPSK), a 16 quadrature amplitude modulation (QAM), a 64 QAM, or a 256 QAM.

Code block group (CBG) transmission information: when a CBG retransmission is configured, indicating information of a CBG to be transmitted.

HARQ process number: indicating a process number of an HARQ.

New data indicator: indicating whether the transmission is an HARQ initial transmission or retransmission.

Redundancy version: indicating a redundancy version of an HARQ.

Physical uplink control channel (PUCCH) resource indicator: indicating a PUCCH resource which transmits ACK/NACK information for downlink data.

PDSCH-to-HARQ_feedback timing indicator: indicating a slot on which ACK/NACK information for downlink data is transmitted.

Transmit power control (TPC) command for PUCCH: indicating a transmit power control command for a PUCCH, which is an uplink control channel.

In a case of PUSCH transmission, the time domain resource assignment may be transferred by information of a slot on which the PUSCH is transmitted, S indicating the position of the starting OFDM symbol of the slot, and L indicating the number of OFDM symbols to which the PUSCH is mapped. S may indicate a relative position from the start of the slot, L may indicate the number of consecutive OFDM symbols, and S and L may be determined from a start and length indicator value (SLIV) defined as below.

If (L−1)≤7 then
 SLIV=14*(L−1)+S
else
 SLIV=14*(14−L+1)+(14−1−S)
where 0<L≤14−S

Generally, in a 5G or NR system, a table including, in one row, a SLIV value, a PUSCH mapping type, and information of a slot on which the PUSCH is transmitted, may be configured through RRC configuration. Thereafter, the time domain resource assignment of DCI may transfer a SLIV value, a PUSCH mapping type, and information of a slot on which the PUSCH is transmitted by a base station to a terminal by indicating an index value in the configured table. This method is also applied to PDSCH.

Specifically, if m, which is the index of the time resource allocation field included in DCI scheduling a PDSCH, is indicated by a base station to a terminal, this indication informs of a combination of DMRS type A position information, PDSCH mapping type information, slot index K0, data resource starting symbol S, and data resource assignment length L, which correspond to m+1 in a table representing time domain resource assignment information. For example, Table 3 below is a table including pieces of normal cyclic prefix-based PDSCH time domain resource assignment information.

TABLE 3

| Row index | dmrs-TypeA-Position | PDSCH mapping type | $K_0$ | S | L |
| --- | --- | --- | --- | --- | --- |
| 1 | 2 | Type A | 0 | 2 | 12 |
|  | 3 | Type A | 0 | 3 | 11 |
| 2 | 2 | Type A | 0 | 2 | 10 |
|  | 3 | Type A | 0 | 3 | 9 |
| 3 | 2 | Type A | 0 | 2 | 9 |
|  | 3 | Type A | 0 | 3 | 8 |
| 4 | 2 | Type A | 0 | 2 | 7 |
|  | 3 | Type A | 0 | 3 | 6 |
| 5 | 2 | Type A | 0 | 2 | 5 |
|  | 3 | Type A | 0 | 3 | 4 |
| 6 | 2 | Type B | 0 | 9 | 4 |
|  | 3 | Type B | 0 | 10 | 4 |
| 7 | 2 | Type B | 0 | 4 | 4 |
|  | 3 | Type B | 0 | 6 | 4 |
| 8 | 2, 3 | Type B | 0 | 5 | 7 |
| 9 | 2, 3 | Type B | 0 | 5 | 2 |

TABLE 3-continued

| Row index | dmrs-TypeA-Position | PDSCH mapping type | $K_0$ | S | L |
|---|---|---|---|---|---|
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

In Table 3, the dmrs-typeA-Position is a field indicating the position of a symbol transmitting a DMRS in one slot indicated by a system information block (SIB), which is one of pieces of terminal-common control information. An available value of the field is 2 or 3. If the number of symbols configuring one slot is a total of 14, and the first symbol index is 0, 2 implies the third symbol, and 3 implies the fourth symbol. In Table 3, the PDSCH mapping type is information notifying of the position of a DMRS in a scheduled data resource region. If the PDSCH mapping type is A, a DMRS is always transmitted or received at a symbol position determined by the dmrs-typeA-Position regardless of an assigned data time domain resource. If the PDSCH mapping type is B, a DMRS is always transmitted or received at the first symbol in an assigned data time domain resource. In other words, PDSCH mapping type B does not use dmrs-typeA-Position information.

In Table 1, $K_0$ implies the offset between the index of a slot to which a physical downlink control channel (PDCCH) transmitting DCI belongs and the index of a slot to which a PDSCH or PUSCH scheduled by the DCI belongs. For example, if the slot index of a PDCCH is n, the slot index of a PDSCH or PUSCH scheduled by DCI of the PDCCH is n+$K_0$. In Table 3, S implies the index of the starting symbol of a data time domain resource in one slot. The range of an available S value is 0 to 13 based on a normal cyclic prefix. In Table 1, L is the length of a data time domain resource interval in one slot. The range of an available L value is 1 to 14.

In a 5G or NR system, a PUSCH mapping type is defined to be type A and type B. In PUSCH mapping type A, the first OFDM symbol among DMRS OFDM symbols is positioned at the second or third OFDM symbol in a slot. In PUSCH mapping type B, the first OFDM symbol among DMRS OFDM symbols is positioned at the first OFDM symbol of a time domain resource assigned for PUSCH transmission. The PUSCH time domain resource assignment method can be identically applied to PDSCH time domain resource assignment.

DCI may be transmitted on a PDCCH (or control information, hereinafter, PDCCH may be used together with control information), which is a downlink physical control channel, through channel coding and modulation processes. Generally, DCI is scrambled by a particular radio network temporary identifier (a RNTI or a terminal identifier) independently for each terminal, and then a cyclic redundancy check (CRC) is added to the DCI. The DCI is channel-coded, and then is configured to be an independent PDCCH to be transmitted. A PDCCH is mapped to a control resource set (CORESET) configured for a terminal, and then is transmitted.

Downlink data may be transmitted on a PDSCH, which is a physical channel for downlink data transmission. A PDSCH may be transmitted after a control channel transmission interval, and scheduling information relating to a specific mapping position in the frequency domain, a modulation scheme, etc. is determined based on DCI transmitted through a PDCCH.

Through MCS among pieces of control information configuring DCI, a base station notifies a terminal of a modulation scheme applied to a PDSCH to be transmitted, and the size (TBS) of data to be transmitted. In an embodiment, MCS may be configured by 5 bits or larger or smaller. A TBS corresponds to the size of data (a transport block), which a base station is to transmit, before channel coding for error correction is applied to the data.

In the disclosure, a transport block (TB) may include a MAC header, a MAC CE, one or more MAC service data units (SDUs), and padding bits. In addition, a TB may indicate the unit of data downloaded from a MAC layer to a physical layer, or a MAC protocol data unit (PDU).

A modulation scheme supported by a 5G or NR system is QPSK, 16 QAM, 64 QAM, and 256 QAM, and the modulation orders ($Q_m$) of them correspond to 2, 4, 6, and 8, respectively. That is, 2 bits per symbol may be transmitted in a case of QPSK modulation, 4 bits per OFDM symbol may be transmitted in a case of 16 QAM modulation, 6 bits per symbol may be transmitted in a case of 64 QAM modulation, and 8 bits per symbol may be transmitted in a case of 256 QAM modulation.

If a PDSCH is scheduled by the DCI, HARQ-ACK information indicating whether decoding of the PDSCH succeeds or fails is transmitted from a terminal to a base station through a PUCCH. HARQ-ACK information is transmitted in a slot indicated by a PDSCH-to-HARQ feedback timing indicator included in DCI scheduling a PDSCH, and a value mapped to each of PDSCH-to-HARQ feedback timing indicators having 1 to 3 bits is configured by a higher layer signal as shown in table 4. If a PDSCH-to-HARQ feedback timing indicator indicates k, a terminal transmits HARQ-ACK information after passage of k slots from slot n transmitting a PDSCH, that is, transmits the HARQ-ACK information in a slot n+k.

TABLE 4

| PDSCH-to-HARQ feedback timing indicator | | | |
|---|---|---|---|
| 1 bit | 2 bits | 3 bits | Number of slots k |
| '0' | '00' | '000' | $1^{st}$ value provided by dl-DataToUL-ACK |
| '1' | '01' | '001' | $2^{nd}$ value provided by dl-DataToUL-ACK |
|  | '10' | '010' | $3^{rd}$ value provided by dl-DataToUL-ACK |
|  | '11' | '011' | $4^{th}$ value provided by dl-DataToUL-ACK |
|  |  | '100' | $5^{th}$ value provided by dl-DataToUL-ACK |
|  |  | '101' | $6^{th}$ value provided by dl-DataToUL-ACK |
|  |  | '110' | $7^{th}$ value provided by dl-DataToUL-ACK |
|  |  | '111' | $8^{th}$ value provided by dl-DataToUL-ACK |

If DCI format 1_1 scheduling a PDSCH does not include a PDSCH-to-HARQ feedback timing indicator, a terminal transmits HARQ-ACK information in slot n+k according to a k value configured through higher layer signaling. When HARQ-ACK information is transmitted on a PUCCH, a terminal transmits the information to a base station by using a PUCCH resource determined based on a PUCCH resource indicator included in DCI scheduling a PDSCH. The ID of the PUCCH resource mapped to the PUCCH resource indicator may be configured through higher layer signaling.

Figure 2:
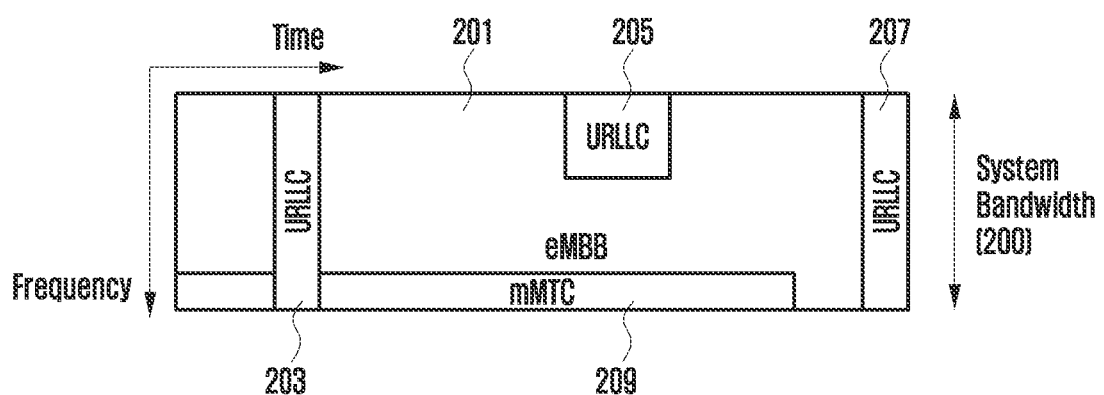
FIG. 2 is a diagram illustrating an example of allocating pieces of data for enhanced mobile broadband (eMBB), ultra-reliable and low-latency communications (URLLC), and massive machine type communications (mMTC) in a time-frequency resource domain in a 5G or NR system according to an embodiment of the disclosure.

FIG. 2 is a diagram illustrating an example of allocating pieces of data for eMBB, URLLC, and mMTC in a time-frequency resource domain in a 5G or NR system according to an embodiment of the disclosure.

Referring to FIG. 2, data for eMBB, URLLC, and mMTC may be allocated in the entire system frequency band 200. If, in a process where eMBB data 201 and mMTC data 209 are allocated and transmitted in a particular frequency band, pieces of URLLC data 203, 205, and 207 occur and are required to be transmitted, a transmitter may empty parts to which the eMBB data 201 and mMTC data 209 have already been assigned, or may not transmit the eMBB data and mMTC data to transmit the URLLC data 203, 205, and 207. Among the above services, URLLC is required to reduce a latency time, and thus URLLC data may be assigned to a part of a resource to which eMBB or mMTC data is allocated, and then may be transmitted. When URLLC data is additionally assigned to a resource to which eMBB or mMTC data is assigned, and then the URLLC data is transmitted, the eMBB data may not be transmitted in the overlapped time-frequency resource, and thus the transmission performance of eMBB data may be degraded. That is, an eMBB data transmission failure may occur due to a URLLC assignment.

Embodiment 1: Grant-Free Transmission/Reception Method

Figure 3:
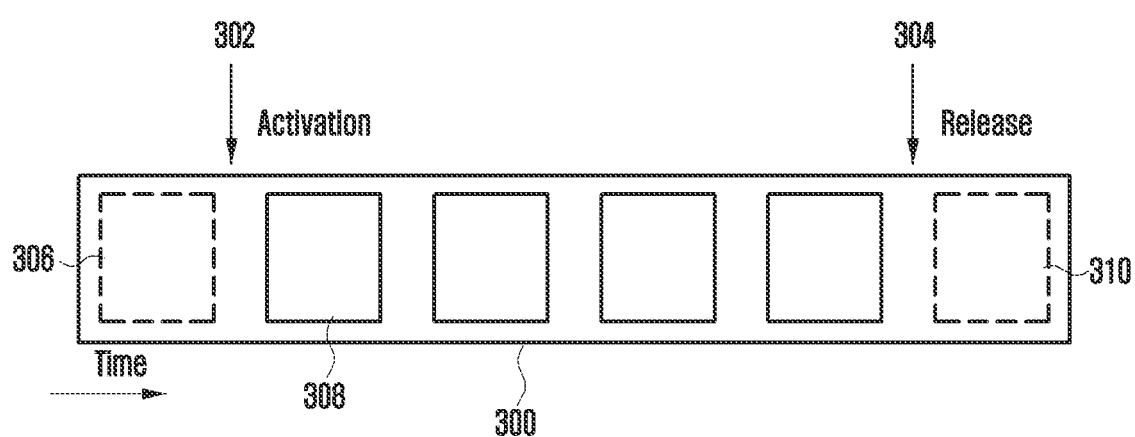
FIG. 3 is a diagram illustrating a grant-free transmission or reception operation according to an embodiment of the disclosure.

FIG. 3 is a diagram illustrating a grant-free transmission or reception operation according to an embodiment of the disclosure.

There are a first signal transmission/reception type in which downlink data is received from a base station according to information configured by only a higher signal, and a second signal transmission/reception type in which downlink data is received according to transmission configuration information indicated by a higher signal and a L1 signal. In the disclosure, a terminal operation method for the second signal transmission/reception type will be mainly described, but the method does not exclude the first signal transmission/reception type. The method proposed in the disclosure may be also used for the first signal transmission/reception type.

DL SPS indicates downlink semi-persistent scheduling, and may indicate both the first signal transmission/reception type and the second signal transmission/reception type, or only one of them. Moreover, DL SPS corresponds to a method in which a base station periodically transmits or receives, to or from a terminal, downlink data information, based on information configured by higher signaling without particular downlink control information scheduling. The DL SPS may be applied to VoIP or a periodically generated traffic situation. A resource configuration for DL SPS is periodic, but actually generated data may be aperiodic. In this case, a terminal does not know whether actual data occurs in the periodically configured resource. Therefore, it may be possible for the terminal to perform the next two types of operations.

Method 1-1: in a case of a periodically configured DL SPS resource region, the terminal transmits, to the base station, HARQ-ACK information with respect to an uplink resource region corresponding to a corresponding resource region relating to a result of demodulating/decoding of received data.

Method 1-2: in a case of a periodically configured DL SPS resource region, if a signal related to a DMRS or data is at least successfully detected, the terminal transmits, to the base station, HARQ-ACK information with respect to an uplink resource region corresponding to a corresponding resource region relating to a result of demodulating/decoding of the received data.

Method 1-3: in a case of a periodically configured DL SPS resource region, if decoding or a demodulation succeeds (i.e. ACK generation), the terminal transmits, to the base station, HARQ-ACK information with respect to an uplink resource region corresponding to a corresponding resource region relating to a result of demodulating/decoding of received data.

According to method 1-1, although the base station actually does not transmit downlink data in the DL SPS resource region, the terminal may always transmit HARQ-ACK information in an uplink resource region corresponding to the DL SPS resource region.

According to method 1-2, the terminal does not know when the base station transmits data in the DL SPS resource region. Therefore, it may be possible for the terminal to transmit HARQ-ACK information in a situation where the terminal knows whether data is transmitted or received, such as when the terminal succeeds in DMRS detection or CRC detection.

According to method 1-3, only when the terminal succeeds in data demodulation/decoding, the terminal transmits HARQ-ACK information in an uplink resource region corresponding to the DL SPS resource region.

The terminal always can support only one of the described methods, or can support two or more of them. The terminal can select one of the methods by using a 3GPP standard protocol or a higher signal. For example, in a case where method 1-1 is indicated by a higher signal, the terminal may transmit HARQ-ACK information for a corresponding DL SPS, based on method 1-1.

Alternatively, one method can be selected according to DL SPS higher configuration information. For example, in the DL SPS higher configuration information, if a transmission period corresponds to n slots or more, the terminal can apply method 1-1, and in the opposite case, the terminal can apply method 1-3. Although a transmission period is used in the example, the methods can be sufficiently applied to an applied MCS table, DMRS configuration information, resource configuration information, and the like.

A terminal performs downlink data reception in a downlink resource region configured through higher signaling. The downlink resource region configured through higher signaling can be activated or released by L1 signaling.

FIG. 3 illustrates an operation for DL SPS according to an embodiment. A terminal may receive one or more of the following pieces of DL SPS configuration information through a higher signal.

Periodicity: a DL SPS transmission period nrofHARQ-Processes: the number of HARQ processes configured for DL SPS n1PUCCH-AN: HARQ resource configuration information for DL SPS mcs-Table: MCS table configuration information applied to DL SPS In the disclosure, all the pieces of DL SPS configuration information can be configured for each Pcell or Scell, and can be also configured to each frequency band part (BWP). Furthermore, one or more DL SPSs can be configured for each BWP or each particular cell.

Referring to FIG. 3, a terminal may determine grant-free transmission/reception configuration information 300 through higher signal reception for DL SPS. The terminal can transmit or receive data in a configured resource region 308 after DCI indicating activation of DL SPS is received (as indicated by reference numeral 302), and is unable to transmit or receive data in a resource region 306 before the DCI is received. Moreover, the terminal is unable to receive data in a resource region 310 after DCI indicating release is received (as indicated by reference numeral 304).

If the following two conditions are both satisfied so as to activate or release SPS scheduling, the terminal may verify a DL SPS assignment PDCCH.

Condition 1: a case where a CRC bit of a DCI format transmitting through the PDCCH is scrambled by a CS-RNTI configured through higher signaling Condition 2: a new data indicator (NDI) field for an activated transport block is configured to be 0.

If a part of fields configuring the DCI format transmitted through the DL SPS assignment PDCCH is the same as that in Table 5 or Table 6, the terminal may determine that information in the DCI format corresponds to valid activation or valid release of DL SPS. For example, when a DCI format including information shown in Table 5 is detected, the terminal may determine that a DL SPS has been activated. As another example, when a DCI format including information shown in Table 6 is detected, the terminal may determine that a DL SPS has been released.

If a part of fields configuring the DCI format transmitted through the DL SPS assignment PDCCH is not the same as that shown in Table 5 (particular field configuration information for activation of DL SPS) or Table 6 (particular field configuration information for release of DL SPS), the terminal may determine that the DCI format has been detected by a CRC that does not match.

TABLE 5

|  | DCI format 1_0 | DCI format 1_1 |
| --- | --- | --- |
| HARQ process number | set to all '0's | set to all '0's |
| Redundancy version | set to '00' | For the enabled transport block: set to '00' |

TABLE 6

|  | DCI format 1_0 |
| --- | --- |
| HARQ process number | set to all '0's |
| Redundancy version | set to '00' |
| Modulation and coding scheme | set to all '1's |
| Resource block assignment | set to all '1's |

When a PDSCH is received without PDCCH reception, or a PDCCH indicating SPS PDSCH release is received, the terminal may generate an HARQ-ACK information bit corresponding to the received PDSCH or PDCCH. In addition, at least in Rel-15 NR, a terminal may not expect to transmit a piece(s) of HARQ-ACK information for reception of two or more SPS PDSCHs, in one PUCCH resource. In other words, at least in Rel-15 NR, the terminal may include only HARQ-ACK information for reception of one SPS PDSCH in one PUCCH resource.

DL SPS may also be configured in a primary cell (PCell) and a secondary cell (SCell). Parameters which may be configured by DL SPS higher signaling are as below.

Periodicity: a DL SPS transmission period nrofHARQ-processes: the number of HARQ processes which may be configured for DL SPS n1PUCCH-AN: a PUCCH HARQ resource for DL SPS, a base station configures the resource by using a PUCCH format 0 or 1.

Tables 5 and 6 show fields that are available in a situation where only one DL SPS can be configured for each cell or each BWP. In a situation where multiple DL SPSs are configured for each cell and each BWP, a DCI field for activating (or releasing) a resource of each of the DL SPSs may be different. The disclosure provides a method for solving the above situation.

In the disclosure, all the DCI formats shown in Tables 5 and 6 are not used to activate or release a DL SPS resource. For example, a DCI format 1_0 and a DCI format 1_1 used for scheduling a PDSCH are used to activate a DL SPS resource. For example, a DCI format 1_0 used for scheduling a PDSCH is used to release a DL SPS resource.

Embodiment 2: HARQ-ACK Codebook Configuration Method

Figure 4:
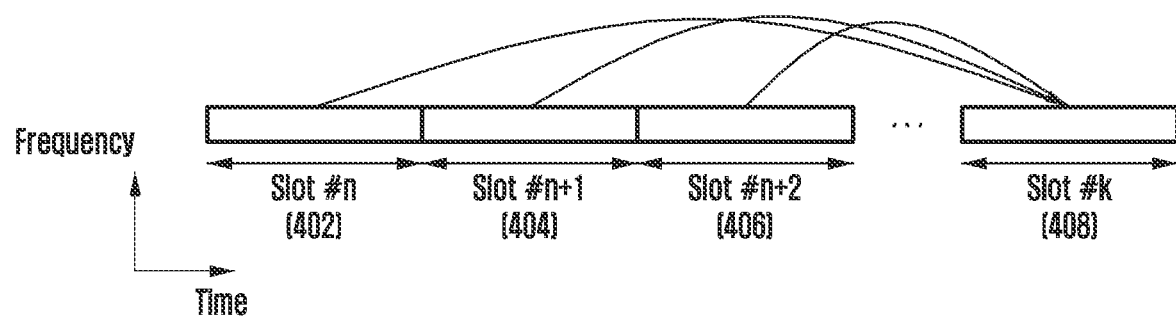
FIG. 4 is a diagram illustrating a method for configuring a semi-static hybrid automatic repeat request acknowledgement (HARQ-ACK) codebook in an NR system according to an embodiment of the disclosure.

FIG. 4 is a diagram illustrating a method for configuring a semi-static HARQ-ACK codebook in an NR system according to an embodiment of the disclosure.

In a situation where the number of HARQ-ACK PUCCHs which the terminal can transmit in one slot is limited to one, when a semi-static HARQ-ACK codebook higher configuration is received by the terminal, the terminal receives a PDSCH in an HARQ-ACK codebook in a slot indicated by the value of a PDSCH-to-HARQ_feedback timing indicator in a DCI format 1_0 or a DCI format 1_1, or report HARQ-ACK information for SPS PDSCH release in the slot. The terminal reports an HARQ-ACK information bit value, which is a NACK, in an HARQ-ACK codebook in a slot that is not indicated by a PDSCH-to-HARQ_feedback timing indicator field in a DCI format 1_0 or a DCI format 1_1. If the terminal reports only HARQ-ACK information for one SPS PDSCH release or one PDSCH reception in $M_{A,C}$ cases for candidate PDSCH reception, and the report is scheduled by a DCI format 1_0 including information indicating that a counter DCI field is 1 in a Pcell, the terminal determines one HARQ-ACK codebook for the SPS PDSCH release or the PDSCH reception.

Other than the above case, an HARQ-ACK codebook determination method according to the below methods is employed.

When a set of PDSCH reception candidate occasions in serving cell c is $M_{A,c}$, $M_{A,c}$ may be obtained through the [pseudo-code 1] stages below.

[Pseudo-Code 1 Start]

stage 1: initializing j to 0, and initializing $M_{A,c}$ to an empty set. Initializing k, which is an HARQ-ACK transmission timing index, to 0.

stage 2: configuring R as a set of rows of a table including information of a slot to which a PDSCH is mapped, starting symbol information, and information of the number or length of symbols. When a PDSCH-available mapping symbol indicated by a value of R is configured to a UL symbol according to DL and UL configurations configured through higher signaling, removing a corresponding row from R.

stage 3-1: receiving, by a terminal, one unicast PDSCH in one slot, and when R is not an empty set, adding one PDSCH to set $M_{A,c}$.

stage 3-2: if the terminal is able to receive two or more unicast PDSCHs in one slot, counting the number of PDSCHs allocatable in different symbols from the calculated R, and adding the counted number of PDSCHs to $M_{A,c}$.

stage 4: increasing k by one and restarting from stage 2. [Pseudo-Code 1 End]

In pseudo-code 1, as illustrated in FIG. 4, in order to transmit an HARQ-ACK PUCCH in slot #k 408, all slot candidates in which a PDSCH-to-HARQ-ACK timing which can indicate slot #k 408 is possible are considered. Referring to FIG. 4, it is assumed that HARQ-ACK transmission is possible in slot #k 408 by a combination of PDSCH-to-HARQ-ACK timings that are possible by only PDSCHs scheduled in slot #n 402, slot #n+1 404, and slot #n+2 406. In consideration of time domain resource configuration information of a PDSCH which can be scheduled in each of the slots 402, 404, and 406, and information indicating whether a symbol in a slot corresponds to the uplink or the downlink, the number of PDSCHs which can be maximally scheduled for each slot is derived. For example, if two PDSCHs can be maximally scheduled in the slot 402, three PDSCHs can be maximally scheduled in the slot 404, and two PDSCHs can be maximally scheduled in the slot 406, the maximum number of PDSCHs included in an HARQ-ACK codebook transmitted in the slot 408 is 7. This is called the cardinality of an HARQ-ACK codebook.

In a particular slot, stage 3-2 will be described through Table 7 below (default PDSCH time domain resource allocation A for normal CP).

TABLE 7

| Row index | dmrs-TypeA-Position | PDSCH mapping type | $K_0$ | S | L | Ending | Order |
|---|---|---|---|---|---|---|---|
| 1 | 2 | Type A | 0 | 2 | 12 | 13 | 1× |
|  | 3 | Type A | 0 | 3 | 11 | 13 | 1× |
| 2 | 2 | Type A | 0 | 2 | 10 | 11 | 1× |
|  | 3 | Type A | 0 | 3 | 9 | 11 | 1× |
| 3 | 2 | Type A | 0 | 2 | 9 | 10 | 1× |
|  | 3 | Type A | 0 | 3 | 8 | 10 | 1× |
| 4 | 2 | Type A | 0 | 2 | 7 | 8 | 1× |
|  | 3 | Type A | 0 | 3 | 6 | 8 | 1× |
| 5 | 2 | Type A | 0 | 2 | 5 | 6 | 1× |
|  | 3 | Type A | 0 | 3 | 4 | 6 | 1× |
| 6 | 2 | Type B | 0 | 9 | 4 | 12 | 2× |
|  | 3 | Type B | 0 | 10 | 4 | 13 | 3 |
| 7 | 2 | Type B | 0 | 4 | 4 | 7 | 1× |
|  | 3 | Type B | 0 | 6 | 4 | 19 | 2 |
| 8 | 2, 3 | Type B | 0 | 5 | 7 | 11 | 1× |
| 9 | 2, 3 | Type B | 0 | 5 | 2 | 6 | 1× |
| 10 | 2, 3 | Type B | 0 | 9 | 2 | 10 | 2× |
| 11 | 2, 3 | Type B | 0 | 12 | 2 | 13 | 3× |
| 12 | 2, 3 | Type A | 0 | 1 | 13 | 13 | 1× |
| 13 | 2, 3 | Type A | 0 | 1 | 6 | 6 | 1× |
| 14 | 2, 3 | Type A | 0 | 2 | 4 | 5 | 1 |
| 15 | 2, 3 | Type B | 0 | 4 | 7 | 10 | 1× |
| 16 | 2, 3 | Type B | 0 | 8 | 4 | 11 | 2× |

Table 7 is a time resource allocation table by which a terminal operates in the default mode before a time resource is allocated for the terminal through a separate RRC signal. For reference, in addition to a row index value being separately indicated by RRC, a PDSCH time resource allocation value is determined by a dmrs-TypeA-Position, which is a terminal-common RRC signal. In Table 7, the ending column and the order column are separately added for convenience of explanation, and it is possible that the two columns do not actually exist. The ending column implies the ending symbol of a scheduled PDSCH, and the order column implies the position value of a code located in a particular codebook in a semi-static HARQ-ACK codebook.

Table 7 is applied to time resource allocation applied to DCI format 1_0 of a common search region of a PDCCH.

A terminal performs the following stages to calculate the maximum number of PDSCHs that do not overlap in a particular slot, so as to determine an HARQ-ACK codebook.

stage 1: searching for a PDSCH allocation value indicating the first ended PDSCH in a slot among all rows in a PDSCH time resource allocation table. In Table 7, it may be noted that a PDSCH indicated by row index 14 is ended first. Row index 14 is expressed by 1 in the order column. Other row indexes, of which PDSCHs overlaps with the PDSCH indicated by row index 14, by at least one symbol, are expressed by 1× in the order column.

stage 2: searching for a PDSCH allocation value indicating the first ended PDSCH among the remaining row indexes which are not expressed in the order column. In Table 7, the PDSCH allocation value corresponds to the row indicated by row index 7 and the dmrs-TypeA-Position value, which is 3. Other row indexes, of which PDSCHs overlaps with the PDSCH indicated by row index 7, by at least one symbol, are expressed by 2× in the order column.

stage 3: increasing order values and expressing the increased order values while repeating stage 2. For example, searching for a PDSCH allocation value indicating the first ended PDSCH among the row indexes which are not expressed in the order column. In Table 7, the PDSCH allocation value corresponds to the row indicated by row index 6 and the dmrs-TypeA-Position value, which is 3. Other row indexes, of which PDSCHs overlaps with the PDSCH indicated by row index 6, by at least one symbol, are expressed by 3× in the order column.

stage 4: when the order is expressed for all the row indexes, ending the procedure. The size of a corresponding order corresponds to the maximum number of PDSCHs which can be scheduled in a corresponding slot without time overlapping. Scheduling without time overlapping means that different PDSCHs are scheduled by TDM.

In the order column of Table 7, the maximum order value implies an HARQ-ACK codebook size of a corresponding slot, and an order value implies an HARQ-ACK codebook point at which an HARQ-ACK feedback bit for a corresponding scheduled PDSCH is positioned. For example, row index 16 in Table 7 implies that an HARQ-ACK feedback bit exists in the second code position in a semi-static HARQ-ACK codebook, the size of which is 3. If a set of occasions for candidate PDSCH receptions in serving cell c is $M_{A,c}$, a terminal transmitting an HARQ-ACK feedback may obtain $M_{A,c}$ through the [pseudo-code 1] or [pseudo-code 2] stages. $M_{A,c}$ may be used to determine the number of HARQ-ACK bits that the terminal is required to transmit. Specifically, an HARQ-ACK codebook may be configured by using the cardinality of a $M_{A,c}$ set.

As another example, the considerations for determination of a semi-static HARQ-ACK codebook (or type 1 HARQ-ACK codebook) may be as below.

a) on a set of slot timing values $K_1$ associated with the active UL BWP
  a) If the UE is configured to monitor PDCCH for DCI format 1_0 and is not configured to monitor PDCCH for DCI format 1_1 on serving cell c, $K_1$ is provided by the slot timing values {1, 2, 3, 4, 5, 6, 7, 8} for DCI format 1_0 b) If the UE is configured to monitor PDCCH for DCI format 1_1 for serving cell c, $K_1$ is provided by dl-DataToUL-ACK for DCI format 1_1 b) on a set of row indexes R of a table that is provided either by a first set of row indexes of a table that is provided by PDSCH-TimeDomainResourceAllocationList in PDSCH-ConfigCommon or by Default PDSCH time domain resource allocation A [6, TS 38.214], or by the union of the first set of row indexes and a second set of row indexes, if provided by PDSCH-TimeDomainResourceAllocationList in PDSCH-Config, associated with the active DL BWP and defining respective sets of slot offsets $K_0$, start and length indicators SLIV, and PDSCH mapping types for PDSCH reception as described in [6, TS 38.214]

c) on the ratio $2^{\mu_{DL}-\mu_{UL}}$ between the downlink SCS configuration $\mu_{DL}$ and the uplink SCS configuration $\mu_{UL}$ provided by subcarrierSpacing in BWP-Downlink and BWP-Uplink for the active DL BWP and the active UL BWP, respectively d) if provided, on TDD-UL-DL-ConfigurationCommon and TDD-UL-DL-ConfigDedicated as described in Subclause 11.1.

As another example, a pseudo-code for determination of an HARQ-ACK codebook may be as below.

[Pseudo-Code 2 Start]

For the set of slot timing values $K_1$, the UE determines a set of $M_{A,c}$ occasions for candidate PDSCH receptions or SPS PDSCH releases according to the following pseudo-code. A location in the Type-1 HARQ-ACK codebook for HARQ-ACK information corresponding to a SPS PDSCH release is the same as that for a corresponding SPS PDSCH reception.

Set j=0-index of occasion for candidate PDSCH reception or SPS PDSCH release
Set B=∅
Set $M_{A,c}$=∅
Set $c(K_1)$ to the cardinality of set $K_1$
Set k=0-index of slot timing values $K_{1,k}$ in descending order of the slot timing values, in set $K_1$ for serving cell c
while $k<c(K_1)$
  if mod $(n_U-K_{1,k}+1, \max(2^{\mu_{UL}-\mu_{DL}}, 1))=0$
  Set $n_D$=0-index of a DL slot within an UL slot
  while $n_D<\max(2^{\mu_{DL}-\mu_{UL}}, 1)$
    Set R to the set of rows
    Set c(R) to the cardinality of R
    Set r=0-index of row in set R
    if slot $n_U$ starts at a same time as or after a slot for an active DL BWP change on serving cell c or an active UL BWP change on the PCell and slot $\lfloor(n_U-K_{1,k})*2^{\mu_{DL}-\mu_{UL}}\rfloor+n_D$ is before the slot for the active DL BWP change on serving cell c or the active UL BWP change on the PCell
    continue;
    else
    while $r<c(R)$
      if the UE is provided TDD-UL-DL-ConfigurationCommon or TDD-UL-DL-ConfigDedicated and, for each slot from slot $\lfloor(n_U-K_{1,k})*2^{\mu_{DL}-\mu_{UL}}\rfloor+n_D-N_{PDSCH}^{repeat}+1$ to slot $\lfloor(n_U-K_{1,k})*2^{\mu_{DL}-\mu_{UL}}\rfloor+n_D$, at least one symbol of the PDSCH time resource derived by row r is configured as UL where $K_{1,k}$ is the k-th slot timing value in set $K_1$,
      R=R/r;
      end if
      r=r+1;
    end while
    if the UE does not indicate a capability to receive more than one unicast PDSCH per slot and R≠∅,
      $M_{A,c}=M_{A,c}\cup j$;
      j=j+1;
      The UE does not expect to receive SPS PDSCH release and unicast PDSCH in a same slot;
    else
      Set c(R) to the cardinality of R
      Set m to the smallest last OFDM symbol index, as determined by the SLIV, among all rows of R
      while R≠∅
        Set r=0
        while $r<c(R)$
          if S≤m for start OFDM symbol index S for row r
          $b_{r,k,n_D}$=j; —index of occasion for candidate PDSCH reception or SPS PDSCH release associated with row r
          R=R/r;
          $B=B\cup b_{r,k,n_D}$;
          end if
          r=r+1;
        end while
        $M_{A,c}=M_{A,c}\cup j$
        j=j+1;
        Set m to the smallest last OFDM symbol index among all rows of R;
      end while
    end if
  end if
  $n_D=n_D+1$;
  end while
end if
k=k+1:
end while

[Pseudo-Code 2 End]

In pseudo-code 2, the position of an HARQ-ACK codebook containing HARQ-ACK information for DCI indicating DL SPS release is based on the position at which a DL SPS PDSCH is received. For example, in a case where the starting symbol at which a DL SPS PDSCH starts to be transmitted is the fourth OFDM symbol based on a slot, and the length thereof is 5 symbols, HARQ-ACK information containing a DL SPS release indicating release of a corresponding SPS is obtained by assuming that a PDSCH is mapped, the PDSCH starting from the fourth OFDM symbol of a slot transmitting the DL SPS release, and having a length of 5 symbols, and determining HARQ-ACK information corresponding to the PDSCH through a PDSCH-to-HARQ-ACK timing indicator and a PUSCH resource indicator included in control information indicating the DL SPS release. As another example, in a case where the starting symbol at which a DL SPS PDSCH starts to be transmitted is the fourth OFDM symbol based on a slot, and the length thereof is 5 symbols, HARQ-ACK information containing a DL SPS release indicating release of a corresponding SPS is obtained by assuming that a PDSCH is mapped, the PDSCH starting from the fourth OFDM symbol of a slot indicated by a time domain resource allocation (TDRA) of DCI which is the DL SPS release, and having a length of 5 symbols, and determining HARQ-ACK information corresponding to the PDSCH through a PDSCH-to-HARQ-ACK timing indicator and a PUSCH resource indicator included in control information indicating the DL SPS release.

Figure 5:
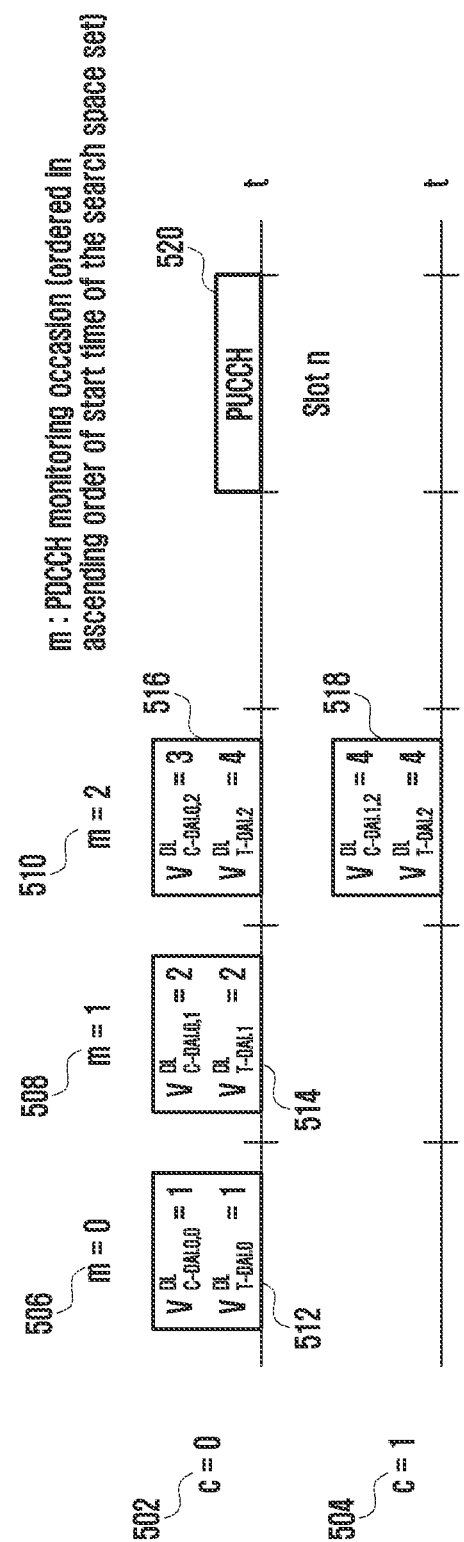
FIG. 5 is a diagram illustrating a method for configuring a dynamic HARQ-ACK codebook in an NR system according to an embodiment of the disclosure.

FIG. 5 is a diagram illustrating a method for configuring a dynamic HARQ-ACK codebook in an NR system according to an embodiment of the disclosure.

Referring to FIG. 5, a terminal transmits HARQ-ACK information transmitted in one PUCCH in slot n, based on a PDSCH-to-HARQ_feedback timing value for PUCCH transmission of HARQ-ACK information in slot n for PDSCH reception or SPS PDSCH release, and a K0 that is transmission slot position information of a PDSCH scheduled by a DCI format 1_0 or 1_1. Specifically, for the above HARQ-ACK information transmission, the terminal determines an HARQ-ACK codebook of a PUCCH transmitted in a slot determined by a PDSCH-to-HARQ_feedback timing and K0, based on a DAI included in DCI indicating a PDSCH or SPS PDSCH release.

The DAI is configured by a counter DAI and a total DAI. The counter DAI is information indicating the position of HARQ-ACK information in a HARQ-ACK codebook, which corresponds to a PDSCH scheduled by a DCI format 1_0 or a DCI format 1_1. Specifically, a counter DAI value in a DCI format 1_0 or 1_1 indicates the accumulative value of PDSCH receptions or SPS PDSCH releases scheduled by the DCI format 1_0 or 1_1 in particular cell c. The above accumulative value is configured based on a PDCCH monitoring occasion in which the scheduled DCI exists and a serving cell.

The total DAI is a value indicating the size of an HARQ-ACK codebook. Specifically, a total DAI value implies the total number of PDSCHs or SPS PDSCH releases which are scheduled at and before the time point at which DCI is scheduled. A total DAI is a parameter used in a case where, in a carrier aggregation (CA) situation, HARQ-ACK information in serving cell c also includes HARQ-ACK information for a PDSCH scheduled in another cell as well as serving cell c. In other words, there is no total DAI parameter in a system operated by one cell.

An example of operation relating to the DAI is illustrated in FIG. 5. FIG. 5 shows that, in a situation where two carriers are configured for a terminal, when the terminal transmits an HARQ-ACK codebook selected based on a DAI, through a PUCCH 520 in an n-th slot of carrier 0 502, the values of a counter DAI (C-DAI) and a total DAI (T-DAI) indicated by DCI discovered in each PDCCH monitoring occasion configured for each of the carriers are changed. First, in DCI discovered in an occasion 506 indicated by m=0, each of the C-DAI and the T-DAI indicates 1 (as indicated by reference numeral 512). In DCI discovered in an occasion 508 indicated by m=1, each of the C-DAI and the T-DAI indicates 2 (as indicated by reference numeral 514). In DCI discovered in an occasion 510 indicated by m=2 in carrier 0 (c=0, 502), the C-DAI indicates 3 (as indicated by reference numeral 516). In DCI discovered in an occasion 510 indicated by m=2 in carrier 1 (c=1, 504), the C-DAI indicates 4 (as indicated by reference numeral 518). If carriers 0 and 1 are scheduled in the same monitoring occasion, all the T-DAIs are indicated by 4.

Referring to FIGS. 4 and 5, the determination of an HARQ-ACK codebook is operated in a situation where only one PUCCH containing HARQ-ACK information is transmitted in one slot. This operation is called mode 1. As an example of a method in which one PUCCH transmission resource is determined in one slot, when PDSCHs scheduled in different pieces of DCI are multiplexed into one HARQ-ACK codebook in the same slot, and the codebook is transmitted, a PUCCH resource selected for HARQ-ACK transmission is determined to be a PUCCH resource indicated by a PUCCH resource field indicated in DCI lastly scheduling a PDSCH. That is, a PUCCH resource indicated by a PUCCH resource field indicated in DCI scheduled before the DCI is neglected.

In the following description, HARQ-ACK codebook determination methods and apparatuses are defined for a situation where two or more PUCCHs containing HARQ-ACK information can be transmitted in one slot. This operation is called mode 2. A terminal can operate only mode 1 (transmission of only one HARQ-ACK PUCCH in one slot) or operate only mode 2 (transmission of one or more HARQ-ACK PUCCHs in one slot). Alternatively, in a case of a terminal supporting both mode 1 and mode 2, it may be possible that a base station configures the terminal to be operated in only one mode by higher signaling, or mode 1 and mode 2 are implicitly configured by a DCI format, an RNTI, a particular field value of DCI, and scrambling. For example, a PDSCH scheduled by a DCI format A, and pieces of HARQ-ACK information associated with the PDSCH are based on mode 1, and a PDSCH scheduled by a DCI format B, and pieces of HARQ-ACK information associated with the PDSCH are based on mode 2.

Whether the above HARQ-ACK codebook is semi-static as illustrated in FIG. 4, or dynamic as illustrated in FIG. 5 is determined by an RRC signal.

Embodiment 3: Method for Transmitting HARQ-ACK for DL SPS

Figure 6:
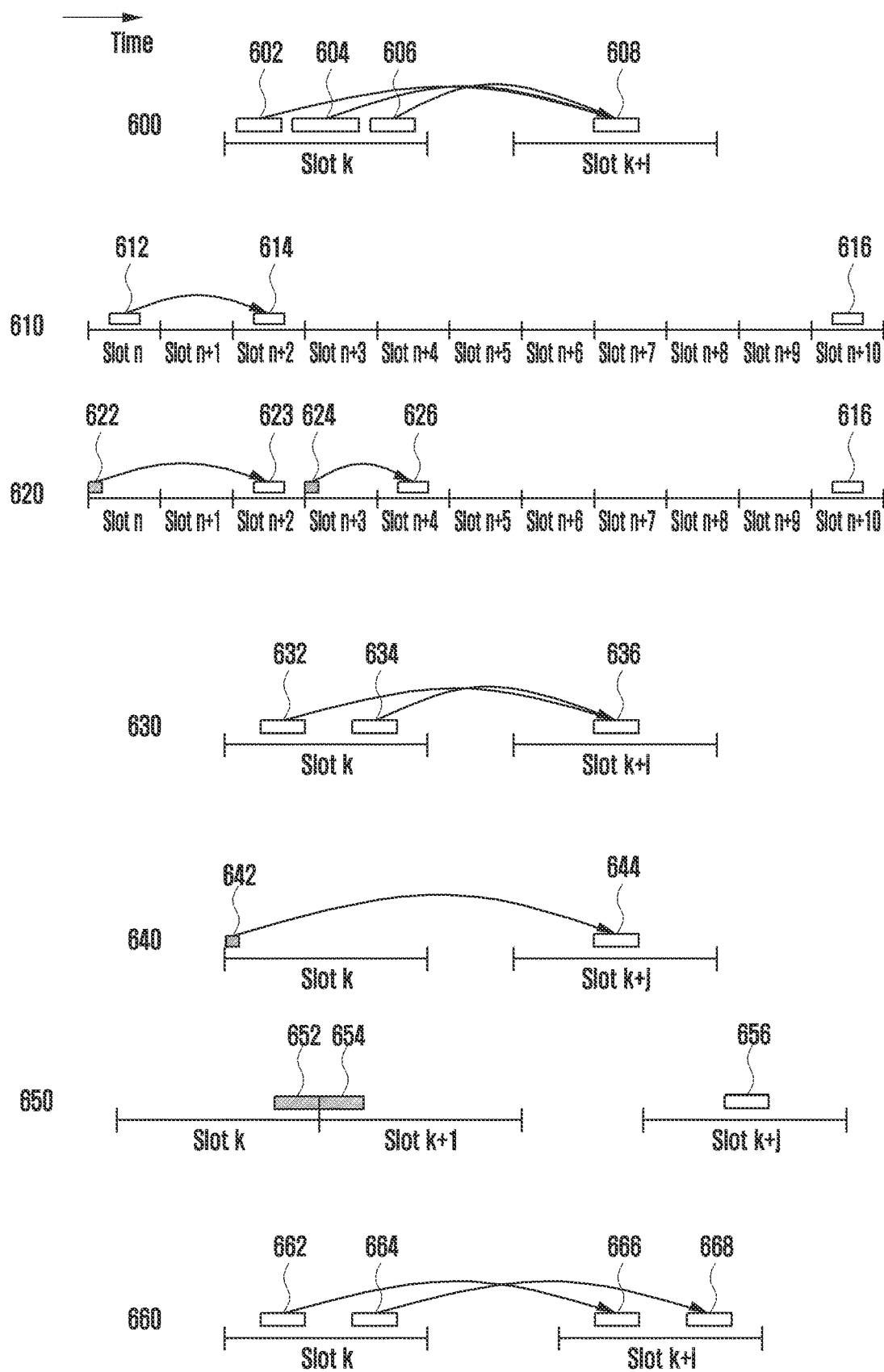
FIG. 6 is a diagram illustrating a process of transmitting an HARQ-ACK for a downlink (DL) semi-persistent scheduling (SPS) according to an embodiment of the disclosure.

FIG. 6 is a diagram illustrating a process of transmitting an HARQ-ACK for a DL SPS according to an embodiment of the disclosure.

Referring to FIG. 6, the case of 600 shows that PDSCHs 602, 604, and 606 are mapped, wherein the PDSCHs can be maximally received while not overlapping with each other in terms of time resource in slot k. For example, if a PDSCH-to-HARQ feedback timing indicator is not included in a DCI format scheduling a PDSCH, a terminal transmits HARQ-ACK information 608 in slot k+1 according to the value of 1, which is configured by higher layer signaling. Therefore, the size of a semi-static HARQ-ACK codebook of slot k+1 is the same as the number of PDSCHs which can be maximally transmitted in slot k, and may be 3. If the size of HARQ-ACK information for each PDSCH is one bit, the HARQ-ACK codebook 608 in the case 600 of FIG. 6 may be configured by a total of 3 bits, which are [X, Y, Z], and X may be HARQ-ACK information for the PDSCH 602, Y may be HARQ-ACK information for the PDSCH 604, and Z may be HARQ-ACK information for the PDSCH 606. If the reception of a PDSCH is successful, the corresponding information may be mapped to an ACK. Otherwise, the information may be mapped to a NACK. If DCI does not actually schedule a corresponding PDSCH, the terminal reports a NACK. Specifically, the position of an HARQ-ACK codebook positioned according to the SLIV of a PDSCH which may be scheduled in DCI may be changed, and may be determined by Table 7, [pseudo code 1], or [pseudo code 2]. The case 610 of FIG. 6 shows the transmission of an HARQ-ACK in a situation where a DL SPS is activated. In Rel-15 NR, the minimum period of a DL SPS is 10 ms. In the case 610, the length of one slot at 15 kHz subcarrier spacing is 1 ms. Therefore, an SPS PDSCH 612 may be transmitted in slot n, and then, an SPS PDSCH 616 will be transmitted in slot n+10.

After the period of the SPS, HARQ-ACK transmission resource information, a MCS table configuration, and the number of HARQ processes are notified of by a higher signal, a frequency resource, a time resource, and an MCS value are informed of through HARQ-ACK information for each of the SPS PDSCHs according to information included in a DCI format indicating the activation of the corresponding SPS. For reference, a PUCCH resource transmitting HARQ-ACK information may be also configured by a higher signal, and the PUCCH resource has the following attributes.

Whether there is hopping

PUCCH format (the starting symbol, and the length of symbols)

In the attributes, there may be no MCS table configuration and HARQ-ACK transmission resource information. If there is HARQ-ACK transmission resource information, Rel-15 NR supports a transmittable PUCCH format 0 or 1, the size of which is up to two bits. However, a release after Rel-15 NR can sufficiently support a PUCCH format 2, 3, or 4, the size of which is two bits or more.

A DL SPS higher signal configuration includes HARQ-ACK transmission resource information. Therefore, the terminal can neglect a PUCCH resource indicator existing in a DCI format indicating the activation of the DL SPS. There may be no PUCCH resource indicator field in the DCI format. Meanwhile, if there is no HARQ-ACK transmission resource information in a DL SPS higher signal configuration, the terminal transmits HARQ-ACK information corresponding to a DL SPS in a PUCCH resource determined by a PUCCH resource indicator in a DCI format activating the DL SPS. In addition, the difference between a slot in which an SPS PDSCH is transmitted, and a slot in which corresponding HARQ-ACK information is transmitted is determined by a value indicated by a PDSCH-to-HARQ-ACK feedback timing indicator of a DCI format activating a DL SPS, or follows a particular value previously configured by a higher signal, when the indicator does not exist. For example, as in the case 610 illustrated in FIG. 6, if a PDSCH-to-HARQ-ACK feedback timing indicator is 2, HARQ-ACK information for the SPS PDSCH 612 transmitted in slot n is transmitted through a PUCCH 614 in slot n+2. Moreover, the PUCCH transmitting the HARQ-ACK information may be configured by a higher signal, or a corresponding resource may be determined by an L1 signal indicating the DL SPS activation. The position of an HARQ-ACK codebook for the SPS PDSCH 612, which is transmitted through the PUCCH 614, is the position of Y in [X Y Z] under an assumption that a maximum of three PDSCHs can be received as in the case 600 of FIG. 6, and the time resource of the PDSCH 612 is the same as that of the PDSCH 604.

If DCI indicating DL SPS release is transmitted, the terminal is required to transmit HARQ-ACK information for the DCI to the base station. However, in a case of a semi-static HARQ-ACK codebook, the size and position of the HARQ-ACK codebook are determined by a time resource region to which a PDSCH is allocated, and a slot interval (PDSCH to HARQ-ACK feedback timing) between the PDSCH and the HARQ-ACK, which is indicated by an L1 signal or a higher signal, as described above in the disclosure. Therefore, when DCI indicating DL SPS release is transmitted to a semi-static HARQ-ACK codebook, a position in the HARQ-ACK codebook is not randomly determined, and requires a particular rule. In Rel-15 NR, the position of HARQ-ACK information for DCI indicating DL SPS release is mapped to be the same as a transmission resource region of a corresponding DL SPS PDSCH. For example, the case 620 illustrated in FIG. 6 shows a situation where DCI 622 indicating the release of a DL SPS PDSCH is transmitted in slot n. If a PDSCH-to-HARQ-ACK feedback timing indicator included in the format of the DCI 622 indicates 2, HARQ-ACK information for the DCI 622 will be transmitted through a PUCCH 623 in slot n+2. The terminal assumes that a pre-configured SPS PDSCH is scheduled in slot n, maps HARQ-ACK information for the DCI 622 indicating DL SPS release to the position of an HARQ-ACK codebook, corresponding to the SPS PDSCH, and transmits the mapped HARQ-ACK information. In relation thereto, the following two methods are possible. A base station and a terminal may transmit or receive corresponding DCI by at least one method according to a protocol or a base station configuration.

method 2-1-1: transmitting DCI indicating DL SPS release only in a slot in which a previously configured SPS PDSCH is to be transmitted.

For example, as in the case 620 illustrated in FIG. 6, if an SPS PDSCH is configured to be transmitted in slot n, a terminal transmits the DCI 622 indicating DL SPS release only in slot n. The position of a slot in which HARQ-ACK information for the DCI is transmitted is the same as that of a slot determined under an assumption that an SPS PDSCH is transmitted. In other words, when a slot in which HARQ-ACK information for a SPS PDSCH is transmitted is slot n+2, a slot in which HARQ-ACK information for DCI indicating the release of a DL SPS PDSCH is transmitted is also slot n+2.

method 2-1-2: transmitting DCI indicating DL SPS release in a random slot regardless of a slot in which a SPS PDSCH is transmitted.

For example, as in the case 620 illustrated in FIG. 6, if an SPS PDSCH is transmitted in slots n, n+10, n+20, . . . , a base station transmits DCI 624 indicating the release of the DL SPS PDSCH in slot n+3. When a value indicated by a PDSCH-to-HARQ-ACK feedback timing indicator included in the DCI is 1, there is no corresponding field, or a value previously configured by a higher signal is 1, HARQ-ACK information 626 for the DCI indicating the release of the DL SPS PDSCH is transmitted and received in slot n+4.

There may be a case where the minimum period of a DL SPS is shorter than 10 ms. For example, if there is data requiring high reliability and low latency in wireless communication between different apparatuses in a factory, and the transmission period of the data is constant and short, the minimum period is required to be shorter than 10 ms, which is the current value. Therefore, a DL SPS transmission period may be determined in units of slots, symbols, or symbol groups rather than the unit of ms and regardless of subcarrier spacing. For reference, the minimum transmission period of an uplink configured grant PUSCH resource is two symbols.

The case 630 illustrated in FIG. 6 shows a situation where a DL SPS transmission period is seven symbols, which are smaller than a slot. The transmission period is within one slot. Therefore, a maximum of two SPS PDSCHs 632 and 634 may be transmitted in slot k. HARQ-ACK information corresponding to the SPS PDSCH 632 and the SPS PDSCH 634 is transmitted in a slot following a value indicated by a PDSCH-to-HARQ-ACK feedback timing indicator included in DCI indicating SPS activation, or a value previously configured by a higher signal if there is no corresponding field. For example, if the value is i, the terminal transmits the HARQ-ACK information 636 for the SPS PDSCH 632 and the SPS PDSCH 634 in slot k+i. The position of an HARQ-ACK codebook included in the HARQ-ACK information is determined in consideration of the transmission period as well as a TDRA, which is time resource information relating times at which the SPS PDSCHs are scheduled. In the method of the related art, only one SPS PDSCH can be transmitted per slot, and thus the position of an HARQ-ACK codebook is determined based on a TDRA, which is time resource information, without considering a transmission period. However, a DL SPS transmission period is smaller than a slot, a transmission period and a TDRA, which is time resource information, are required to be considered together to determine the position of an HARQ-ACK codebook. The TDRA is a time domain resource allocation, and includes starting symbol and length information for transmission of an SPS PDSCH. For example, if a DL SPS transmission period is seven symbols, and the starting symbols and the length of a DL SPS PDSCH, determined by a TDRA, are 2 and 3, respectively, two DL SPS PDSCHs may exist in one slot as in the case 630 of FIG. 6. That is, the first SPS PDSCH 632 is a PDSCH having OFDM symbol indexes 2, 3, and 4 determined in a TDRA, and the second SPS PDSCH 634 is a PDSCH having OFDM symbol indexes 9, 10, and 11 in consideration of the TDRA and the transmission period, which is seven symbols. That is, the second SPS PDSCH in the slot has the same length as that of the first SPS PDSCH, but has an offset moved by the transmission period. In summary, with respect to the generation or determination of a semi-static HARQ-ACK codebook, a terminal determines the position of an HARQ-ACK codebook for an SPS PDSCH in one slot by using time resource allocation information when the transmission period of the SPS PDSCH is larger than one slot, and considering time resource allocation information and the SPS PDSCH transmission period together when the transmission period of the SPS PDSCH is smaller than one slot. For example, the case 640 illustrated in FIG. 6 shows a situation where DCI 642 indicating the release of a DL SPS PDSCH is transmitted in slot k. If a PDSCH-to-HARQ-ACK feedback timing indicator included in the format of the DCI 642 indicates j, HARQ-ACK information for the DCI 642 will be transmitted through a PUCCH 644 in slot k+j.

When an SPS PDSCH transmission period is smaller than one slot, an SPS PDSCH may extend over a slot boundary according to a combination of the transmission period and a TDRA. The case 650 of FIG. 6 shows the corresponding example, and in this case, the base station configures one PDSCH, which extends over the slot boundary, to be divided into a PDSCH 652 and a PDSCH 654 and then be repeatedly transmitted. The PDSCH 652 and the PDSCH 654 can always have an identical length, or different lengths. In addition, only one piece of HARQ-ACK information 656 for the SPS PDSCH configured by the PDSCH 652 and the PDSCH 654 is transmitted by a terminal, and a basis slot for the transmission is slot k+1 in which the PDSCH 654 is repeatedly transmitted lastly.

Embodiment 3-1: Method for Mapping Semi-Static HARQ-ACK Codebook for DCI Indicating DL SPS Release In a case where the transmission period of an SPS PDSCH is smaller than one slot, when a terminal transmits HARQ-ACK information for DCI requesting the release of the SPS PDSCH, based on a semi-static HARQ-ACK codebook, the terminal maps the HARQ-ACK codebook for the DCI by at least one of the following methods.

method 2-2-1: the position of a semi-static HARQ-ACK codebook for HARQ-ACK information for DCI indicating the release of an SPS PDSCH is the same as that of an HARQ-ACK codebook for an SPS PDSCH which is positioned at the foremost in terms of time resource among SPS PDSCHs received in one slot.

in a case where the number of SPS PDSCHs of a slot in which DCI indicating the release of a SPS PDSCH is transmitted is two or more, the terminal maps HARQ-ACK information for the DCI to the position of a semi-static HARQ-ACK codebook for HARQ-ACK information of the first SPS PDSCH in terms of time, and transmits the mapped HARQ-ACK information.

For example, in a case where the number of PDSCHs which, in a slot in which DCI indicating SPS PDSCH release is to be transmitted, include an SPS PDSCH and can be maximally transmitted or received without simultaneous PDSCH reception is 4, the size of an HARQ-ACK codebook for the slot is 4. HARQ-ACK information will be mapped at positions, such as {1, 2, 3, 4}, for the reception of an SPS PDSCH or a PDSCH. If corresponding pieces of HARQ-ACK information of two SPS PDSCHs are mapped at the positions of {2} and {3}, respectively, HARQ-ACK information indicating the release of a DL SPS PDSCH is mapped to the {2} position.

method 2-2-2: the position of a semi-static HARQ-ACK codebook for HARQ-ACK information for DCI indicating the release of an SPS PDSCH is the same as that of an HARQ-ACK codebook for an SPS PDSCH which is positioned at the latest in terms of time resource among SPS PDSCHs received in one slot.

in a case where the number of SPS PDSCHs of a slot in which DCI indicating the release of a SPS PDSCH is transmitted is two or more, the terminal maps HARQ-ACK information for the DCI to the position of a semi-static HARQ-ACK codebook for HARQ-ACK information of the last SPS PDSCH in terms of time, and transmits the mapped HARQ-ACK information.

For example, in a case where the number of PDSCHs which includes an SPS PDSCH and can be maximally transmitted or received without simultaneous PDSCH reception in a slot in which DCI indicating SPS PDSCH release is to be transmitted is 4, the size of an HARQ-ACK codebook for the slot is 4. HARQ-ACK information will be mapped at positions, such as {1, 2, 3, 4}, for the reception of an SPS PDSCH or a PDSCH. If corresponding pieces of HARQ-ACK information of two SPS PDSCHs are mapped at the positions of {2} and {3}, respectively, HARQ-ACK information indicating the release of a DL SPS PDSCH is mapped to the {3} position.

method 2-2-3: the position of a semi-static HARQ-ACK codebook for HARQ-ACK information for DCI indicating the release of an SPS PDSCH is the same as those of HARQ-ACK codebooks for SPS PDSCHs received in one slot.

in a case where the number of SPS PDSCHs of a slot in which DCI indicating the release of a SPS PDSCH is transmitted is two or more, the terminal repeatedly maps HARQ-ACK information for the DCI to the positions of semi-static HARQ-ACK codebooks for HARQ-ACK information of all the SPS PDSCHs, and transmits the mapped HARQ-ACK information.

For example, in a case where the number of PDSCHs which includes an SPS PDSCH and can be maximally transmitted or received without simultaneous PDSCH reception in a slot in which DCI indicating SPS PDSCH release is to be transmitted is 4, the size of an HARQ-ACK codebook for the slot is 4. HARQ-ACK information will be mapped at positions, such as {1, 2, 3, 4}, for the reception of an SPS PDSCH or a PDSCH. If corresponding pieces of HARQ-ACK information of two SPS PDSCHs are mapped at the positions of {2} and {3}, respectively, HARQ-ACK information indicating the release of a DL SPS PDSCH is repeatedly mapped to the {2} and {3} positions. That is, the same HARQ-ACK information is mapped at the {2} and {3} positions.

method 2-2-4: the position of a semi-static HARQ-ACK codebook for HARQ-ACK information for DCI indicating the release of an SPS PDSCH is the same as one selected by a base station by using a higher signal, a L1 signal, or a combination thereof, among multiple HARQ-ACK codebook candidate positions for SPS PDSCHs received in one slot.

in a case where the number of SPS PDSCHs of a slot in which DCI indicating the release of a SPS PDSCH is transmitted is two or more, the base station selects one position among semi-static HARQ-ACK codebook positions for HARQ-ACK information of the SPS PDSCHs by using a higher signal, a L1 signal, or a combination thereof, and the terminal maps HARQ-ACK information for the DCI to the selected position, and transmits the mapped HARQ-ACK information.

For example, in a case where the number of PDSCHs which includes an SPS PDSCH and can be maximally transmitted or received without simultaneous PDSCH reception in a slot in which DCI indicating SPS PDSCH release is to be transmitted is 4, the size of an HARQ-ACK codebook for the slot is 4. HARQ-ACK information will be mapped at positions, such as {1, 2, 3, 4}, for the reception of an SPS PDSCH or a PDSCH. If corresponding pieces of HARQ-ACK information of two SPS PDSCHs are mapped at the positions of {2} and {3}, respectively, the base station selects {2} by using DCI indicating the release of a DL SPS PDSCH, and the terminal maps HARQ-ACK information indicating the release of the DL SPS PDSCH at the {2} position, and transmits the mapped HARQ-ACK information. A DCI field for determining the position of the semi-static HARQ-ACK codebook may be a time resource allocation field, an HARQ-ACK process number, or a PDSCH-to-HARQ feedback timing indicator. For example, a time resource allocation field in DCI indicating the release of an SPS PDSCH may indicate time resource information of one SPS PDSCH among SPS PDSCHs transmittable in a corresponding slot, and the terminal may transmit HARQ-ACK information of the DCI at the position of a semi-static HARQ-ACK codebook corresponding to the indicated SPS PDSCH.

method 2-2-5: the position of a semi-static HARQ-ACK codebook for HARQ-ACK information for DCI indicating the release of an SPS PDSCH is indicated or configured by a base station by using a higher signal, a L1 signal, or a combination thereof.

in a case where the number of PDSCHs which can be maximally received without time overlapping in a slot in which DCI indicating the release of a SPS PDSCH is transmitted is two or more, the base station selects one position among semi-static HARQ-ACK codebook positions for HARQ-ACK information of the PDSCHs by using a higher signal, a L1 signal, or a combination thereof, and the terminal maps HARQ-ACK information for the DCI to the selected position, and transmits the mapped HARQ-ACK information.

a set of semi-static HARQ-ACK codebook positions selectable by a base station by method 2-2-4 includes semi-static HARQ-ACK codebook positions to which pieces of HARQ-ACK information for SPS PDSCHs can be mapped. A set of semi-static HARQ-ACK codebook positions selectable by a base station by method 2-2-5 includes semi-static HARQ-ACK codebook positions to which pieces of HARQ-ACK information for all PDSCHs can be mapped.

For example, in a case where the number of PDSCHs which includes an SPS PDSCH and can be maximally transmitted or received without simultaneous PDSCH reception in a slot in which DCI indicating SPS PDSCH release is to be transmitted is 4, the size of an HARQ-ACK codebook for the slot is 4. HARQ-ACK information will be mapped at positions, such as {1, 2, 3, 4}, for the reception of an SPS PDSCH or a PDSCH. The base station selects {1} by using DCI indicating the release of a DL SPS PDSCH, and the terminal maps HARQ-ACK information indicating the release of the DL SPS PDSCH at the {1} position, and transmits the mapped HARQ-ACK information. A DCI field for determining the position of the semi-static HARQ-ACK codebook may be a time resource allocation field, an HARQ-ACK process number, or a PDSCH-to-HARQ feedback timing indicator. For example, a time resource allocation field in DCI indicating the release of an SPS PDSCH indicates time resource information of one PDSCH among PDSCHs transmittable in a corresponding slot, and the terminal transmits HARQ-ACK information of the DCI at the position of a semi-static HARQ-ACK codebook corresponding to the indicated PDSCH.

The above methods may be possible in a situation where it is configured that one HARQ-ACK transmission is supported in one slot. If a code block group (CBG)-based transmission is configured through a DL SPS PDSCH by higher signaling, a terminal may repeat HARQ-ACK information for DCI indicating the release of the DL SPS PDSCH by the number of CBGs, and map the repeated HARQ-ACK information to a semi-static HARQ-ACK codebook resource determined by at least one of the above methods, and transmit the mapped HARQ-ACK information. The above method is described as a method for transmitting HARQ-ACK information for a DL SPS PDSCH indicating the release of reception or transmission of one SPS PDSCH. However, the above method is also sufficiently possible without particular modification as a method for transmitting HARQ-ACK information for a DL SPS PDSCH indicating the simultaneous release of transmission or reception of two or more activated PDSCHs in one cell/one BWP. For example, if one DL SPS PDSCH release signal is related to multiple SPS PDSCHs activated in one cell/one BWP, SPS PDSCHs considered for selection of an HARQ-ACK codebook position may representatively belong to one configuration, or may belong to all configurations. If SPS PDSCHs may representatively belong to one configuration, the representative configuration may have a configuration number of an SPS PDSCH, the index of which is lowest, or may be a configuration of the first activated SPS PDSCH. The above description corresponds to merely an example, and other similar methods may be sufficiently possible.

Embodiment 3-2: Method for Mapping Dynamic HARQ-ACK Codebook for Multiple SPS PDSCHs Transmitted in One Slot In relation to a dynamic HARQ-ACK codebook (or Type 2 HARQ-ACK codebook), the position of corresponding HARQ-ACK information is basically determined by a total DAI and a counter DAI included in DCI scheduling a PDSCH. The total DAI indicates the size of an HARQ-ACK codebook transmitted in slot n, and the counter DAI indicates the position of an HARQ-ACK codebook transmitted in slot n. In Rel-15 NR, a dynamic HARQ-ACK codebook is configured by [pseudo-code 3] below.
[Pseudo-Code 3 Start]
If the UE transmits HARQ-ACK information in a PUCCH in slot n and for any PUCCH format, the UE determines the $\tilde{o}_0^{ACK}, \tilde{o}_1^{ACK}, \ldots \tilde{o}_{O^{ACK}-1}^{ACK}$, for a total number of $O_{ACK}$ HARQ-ACK information bits, according to the following pseudo-code:
  Set m=0-PDCCH with DCI format 1_0 or DCI format 1_1 monitoring occasion index: lower index corresponds to earlier PDCCH with DCI format 1_0 or DCI format 1_1 monitoring occasion
  Set j=0
  Set $V_{temp}$=0
  Set $V_{temp2}$=0
  Set $V_S$=Ø
  Set $N_{cells}^{DL}$ to the number of serving cells configured by higher layers for the UE
  Set M to the number of PDCCH monitoring occasion(s)
  while m<M
    Set c=0-serving cell index: lower indexes correspond to lower RRC indexes of corresponding cell
    while c<$N_{cells}^{DL}$
    if PDCCH monitoring occasion m is before an active DL BWP change on serving cell c or an active UL BWP change on the PCell and an active DL BWP change is not triggered by a DCI format 1_1 in PDCCH monitoring occasion m
      c=c+1;
    else
      if there is a PDSCH on serving cell c associated with PDCCH in PDCCH monitoring occasion m, or there is a PDCCH indicating SPS PDSCH release on serving cell c
        if $V_{C-DAI,c,m}^{DL} \leq V_{temp}$
          j=j+1
        end if
        $V_{temp} = V_{C-DAI,c,m}^{DL}$
        if $V_{T-DAI,m}^{DL}$=Ø
          $V_{temp2} = V_{C-DAI,c,m}^{DL}$
        else
          $V_{temp2} = V_{T-DAI,m}^{DL}$
        end if
        if harq-ACK-SpatialBundlingPUCCH is not provided and m is a monitoring occasion for PDCCH with DCI format 1_0 or DCI format 1_1 and the UE is configured by maxNrofCodeWordsScheduledByDCI with reception of two transport blocks for at least one configured DL BWP of at least one serving cell, $\tilde{o}_{8j+2(V_{C-DAI,c,m}^{DL}-1)}^{ACK}$=HARQ-ACK information bit corresponding to the first transport block of this cell
$\tilde{o}_{8j+2(V_{C-DAI,c,m}^{DL}-1)+1}^{ACK}$=HARQ-ACK information bit corresponding to the second transport block of this cell
$V_s = V_s \cup \{8j+2(V_{C-DAI,c,m}^{DL}-1), 8j+2(V_{C-DAI,c,m}^{DL}-1)+1\}$
        elseif harq-ACK-SpatialBundlingPUCCH is provided to the UE and m is a monitoring occasion for PDCCH with DCI format 1_1 and the UE is configured by maxNrofCodeWordsScheduledByDCI with reception of two transport blocks in at least one configured DL BWP of a serving cell, $\tilde{o}_{4j+V_{C-DAI,c,m}^{DL}-1}^{ACK}$ =binary AND operation of the HARQ-ACK information bits corresponding to the first and second transport blocks of this cell
$V_s = V_s \cup \{4j+V_{C-DAI,c,m}^{DL}-1\}$
        else
$\tilde{o}_{4j+V_{C-DAI,c,m}^{DL}-1}^{ACK}$=HARQ-ACK information bit of this cell
$V_s = V_s \cup \{4j+V_{C-DAI,c,m}^{DL}-1\}$
        end if
      end if
      c=c+1
    end if
    end while
    m=m+1
  end while
  if $V_{temp2} < V_{temp}$
    j=j+1
  end if
  if harq-ACK-SpatialBundlingPUCCH is not provided to the UE and the UE is configured by maxNrofCodeWordsScheduledByDCI with reception of two transport blocks for at least one configured DL BWP of a serving cell,
    $O^{ACK} = 2 \cdot (4 \cdot j + V_{temp2})$
  else
    $O^{ACK} = 4 \cdot j + V_{temp\,2}$
  end if
  $\tilde{o}_i^{ACK}$ =NACK for any i∈{0, 1, . . . $O^{ACK}$−1}\$V_s$
  Set c=0
  while c<$N_{cells}^{DL}$
    if SPS PDSCH reception is activated for a UE and the UE is configured to receive SPS PDSCH in a slot n−$K_{1,c}$ for serving cell c, where $K_{1,c}$ is the PDSCH-to-HARQ-feedback timing value for SPS PDSCH on serving cell c
      $O^{ACK} = O^{ACK} + 1$
      $O_{O^{ACK}-1}^{ACK}$=HARQ-ACK information bit associated with the SPS PDSCH reception
    end if
    c=c+1;
  end while
[Pseudo-Code 3 End]

[pseudo-code 3] is applied when the transmission period of an SPS PDSCH is larger than one slot. When the transmission period of an SPS PDSCH is smaller than one slot, a dynamic HARQ-ACK codebook is configured by [pseudo-code 4] below. Alternatively, [pseudo-code 4] may be generally applied regardless of an SPS PDSCH transmission period or the number of SPS PDSCHs activated in one cell/one BWP.

[Pseudo-Code 4 Start]

If the UE transmits HARQ-ACK information in a PUCCH in slot n and for any PUCCH format, the UE determines the $\tilde{o}_0^{ACK}, \tilde{o}_1^{ACK}, \ldots, \tilde{o}_{O^{ACK}-1}^{ACK}$, for a total number of $O_{ACK}$ HARQ-ACK information bits, according to the following pseudo-code:

Set m=0–PDCCH with DCI format 1_0 or DCI format 1_1 monitoring occasion index: lower index corresponds to earlier PDCCH with DCI format 1_0 or DCI format 1_1 monitoring occasion
Set j=0
Set $V_{temp}=0$
Set $V_{temp2}=0$
Set $V_s=\emptyset$
Set $N_{cells}^{DL}$ to the number of serving cells configured by higher layers for the UE
Set M to the number of PDCCH monitoring occasion(s)
while m<M
  Set c=0-serving cell index: lower indexes correspond to lower RRC indexes of corresponding cell
  while c<$N_{cells}^{DL}$
    if PDCCH monitoring occasion m is before an active DL BWP change on serving cell c or an active UL BWP change on the PCell and an active DL BWP change is not triggered by a DCI format 1_1 in PDCCH monitoring occasion m
      c=c+1;
    else
      if there is a PDSCH on serving cell c associated with PDCCH in PDCCH monitoring occasion m, or there is a PDCCH indicating SPS PDSCH release on serving cell c
        if $V_{C-DAI,c,m}^{DL} \leq V_{temp}$
          j=j+1
        end if
        $V_{temp}=V_{C-DAI,c,m}^{DL}$
        if $V_{T-DAI,m}^{DL}=\emptyset$
          $V_{temp2}=V_{C-DAI,c,m}^{DL}$
        else
          $V_{temp2}=V_{T-DAI,m}^{DL}$
        end if
        if harq-ACK-SpatialBundlingPUCCH is not provided and m is a monitoring occasion for PDCCH with DCI format 1_0 or DCI format 1_1 and the UE is configured by maxNrofCodeWordsScheduledByDCI with reception of two transport blocks for at least one configured DL BWP of at least one serving cell,
          $\tilde{o}_{8j+2}^{ACK}(V_{C-DAI,c,m}^{DL}-1)$=HARQ-ACK information bit corresponding to the first transport block of this cell
          $\tilde{o}_{8j+2}^{ACK}(V_{C-DAI,c,m}^{DL}-1)+1$=HARQ-ACK information bit corresponding to the second transport block of this cell
          $V_s=V_s \cup \{8 j+2 (V_{C-DAI,c,m}^{DL}-1), 8 j+2(V_{C-DAI,c,m}^{DL}-1)+1\}$
        elseif harq-ACK-SpatialBundlingPUCCH is provided to the UE and m is a monitoring occasion for PDCCH with DCI format 1_1 and the UE is configured by maxNrofCodeWordsScheduledByDCI with reception of two transport blocks in at least one configured DL BWP of a serving cell,
          $\tilde{o}_{4j+V_{C-DAI,c,m}^{DL}-1}^{ACK}$=binary AND operation of the HARQ-ACK information bits corresponding to the first and second transport blocks of this cell
          $V_s=V_s \cup \{4 j+V_{C-DAI,c,m}^{DL}-1\}$
        else
          $\tilde{o}_{4j+V_{C-DAI,c,m}^{DL}-1}^{ACK}$=HARQ-ACK information bit of this cell
          $V_s=V_s \cup \{4 j+V_{C-DAI,c,m}^{DL}-1\}$
        end if
      end if
      c=c+1
    end if
  end while
  m=m+1
end while
if $V_{temp2}<V_{temp}$
  j=j+1
end if
if harq-ACK-SpatialBundlingPUCCH is not provided to the UE and the UE is configured by maxNrofCodeWordsScheduledByDCI with reception of two transport blocks for at least one configured DL BWP of a serving cell,
  $O^{ACK}=2\cdot(4, j+V_{temp2})$
else
  $O^{ACK}=4\cdot j+V_{temp2}$
end if
$\tilde{o}_i^{ACK}$=NACK for any $i \in \{0, 1, \ldots O^{ACK}-1\} \backslash V_s$
Set c=0
while c<$N_{cells}^{DL}$
  if SPS PDSCH reception is activated for a UE and the UE is configured to receive multiple SPS PDSCHs in a slot n=$K_{1,c}$ for serving cell c, where $K_{1,c}$ is the PDSCH-to-HARQ-feedback timing value for SPS PDSCH on serving cell c
    $O^{ACK}=O^{ACK}+k$ where k is the number of multiple SPS PDSCHs in a slot n–$K_{1,c}$
    $O_{O^{ACK}-1}^{ACK}$=HARQ-ACK information bit associated with the SPS PDSCH reception
  end if
  c=c+1;
end while

[Pseudo-Code 4 End]

In [pseudo-code 4], a K value, which is the number of SPS PDSCHs within one slot, corresponds to only one SPS PDSCH configuration in one cell/one BWP, or may include all SPS PDSCH configurations when multiple SPS PDSCH configurations are possible in one cell/one BWP.

[pseudo-code 3] or [pseudo-code 4] may be applied to a situation where the number of HARQ-ACK information transmissions is limited to a maximum of one per slot.

Embodiment 3-3: Method for Transmitting Individual HARQ-ACKs for Multiple SPS PDSCHs Transmitted in One Slot In a case where a base station configures a terminal to employ a DL SPS transmission period smaller than one slot, and transmit only one HARQ-ACK information per slot by a higher signal, the terminal transmits pieces of HARQ-ACK information for a DL SPS PDSCH 632 and a DP SPS PDSCH 634 received in slot k, through a PUCCH of slot k+1 previously indicated by a higher signal, a L1 signal, or a combination thereof, as illustrated in the case 630 in FIG. 6. For example, the terminal determines, as a slot level, the granularity of a PDSCH-to-HARQ-ACK timing indicator in a DCI format indicating DL SPS activation, and the base station provides the terminal with a difference value between the index of a slot receiving a DL SPS PDSCH and the index of a slot transmitting HARQ-ACK information, and configures, for the terminal, a PUCCH resource in which HARQ-ACK information is transmitted in a slot indicated by L1, by using a higher signal. The case 630 illustrated in FIG. 6 shows a situation where PDSCH to HARQ-ACK timing indicates the i value. The value can be directly selected by a L1 signal, or can be determined by configuring candidate values by using a higher signal and selecting one value among them by an L1 signal.

If the terminal or the base station wants to transmit or receive pieces of HARQ-ACK information for individually transmitted or received DL SPS PDSCHs, the base station may configure a DL SPS transmission period smaller than one slot, and two or more HARQ-ACK transmissions per slot by using a higher signal. For example, as illustrated in the case 660 of FIG. 6, the terminal may transmit HARQ-ACK information for an SPS PDSCH 662 received in slot k, through a PUCCH 666 in slot k+i, and transmit HARQ-ACK information for an SPS PDSCH 664 through a PUCCH 668 in slot k+i. To this end, for example, the terminal determines, as a symbol level, the granularity of a PDSCH-to-HARQ-ACK timing indicator in a DCI format indicating DL SPS activation. The value implies the total symbol length from the transmission ending symbol (or transmission starting symbol) of an SPS PDSCH to the transmission starting symbol (or transmission ending symbol) of a PUCCH through which corresponding HARQ-ACK information is transmitted. When the ending symbol of the SPS PDSCH 662 is s0, and the starting symbol of the PUCCH 666 through which HARQ-ACK information for the SPS PDSCH 662 is s1 in the case 660 illustrated in FIG. 6, a value indicated by a PDSCH to HARQ-ACK timing indicator may be "s1−s0". The value can be directly selected by a L1 signal, or can be configured by configuring candidate values by using a higher signal and determining one value among them by an L1 signal. Through the information, the terminal may determine the starting symbol of a PUCCH through which HARQ-ACK information for an SPS PDSCH is to be transmitted. Other pieces of PUCCH transmission information may be determined by a higher signal, an L1 signal, or a combination thereof. If a PUCCH resource indicator existing in a higher signal or an L1 of Rel-15 is used, the terminal may determine that a "starting symbol index" field among values indicated by the indicator is not used. Alternatively, independently therefrom, a starting symbol in which HARQ-ACK information starts to be transmitted has already been provided through PDSCH to HARQ-ACK timing indicator information. Therefore, a new higher signal, an L1 signal, or a signal configured by a combination thereof, which lack the corresponding field, may be provided to the terminal. In short, the terminal may differently interpret a PDSCH-to-HARQ-ACK timing indicator field included in DCI indicating SPS PDSCH activation according to an SPS PDSCH transmission period, as below.

method 2-3-1: Determination as Slot Level
        For example, if the transmission period of an SPS PDSCH is larger than one slot, the terminal determines the granularity of a PDSCH-to-HARQ-ACK timing indicator, as a slot level.

method 2-3-2: Determination as Symbol Level
        For example, if the transmission period of an SPS PDSCH is smaller than one slot, the terminal determines the granularity of a PDSCH-to-HARQ-ACK timing indicator, as a symbol level.

Embodiment 3-4: Method for Changing DL SPS/CG Period for Aperiodic Traffic

A transmission period of a DL SPS supported by a base station may be a unit of a slot level or a symbol level. In a case where information that is sensitive to the latency time of an apparatus operated in a factory is periodically generated, and the period is not a value of a protocol supported by a 3GPP standard organization, or a multiple of the value, the base station may not configure an effective DL SPS transmission period. For example, if there is a traffic pattern having the interval of 2.5 symbols, the base station may be required not to allocate only a DL SPS having the transmission period of two symbols or three symbols. Therefore, it is required to configure a DL SPS transmission period having aperiodicity, or introduce a signal for dynamically changing a transmission period. A terminal can dynamically change a transmission period by at least one of the following methods.

method 2-4-1: Method for Allocating a DL SPS transmission period having aperiodicity.
        the base station can configure a DL SPS transmission period in a bitmap type. For example, in a case where there is bitmap information configured by 10 bits as a higher signal, 1 indicates a DL SPS transmission, and 0 indicates non-DL SPS transmission, when the unit of the bit indicates the unit of a slot, the base station may make various patterns of DL SPS transmission periods, which may not have periodicity, for ten slots. A corresponding pattern may be repeated by the unit of ten slots. Alternatively, a bitmap size and an interval indicated by a corresponding bit may be a slot, a symbol, or a symbol group. Corresponding pieces of information can be independently configured by a higher signal, or the range of a transmission interval which may be indicated by each bit can vary depending on the size of a bitmap. For example, if the size of a bitmap is 20, a time range indicated by each bit is the unit of seven symbols. If the size of a bitmap is 10, a time range indicated by each bit is the unit of a slot.

Figure 8:
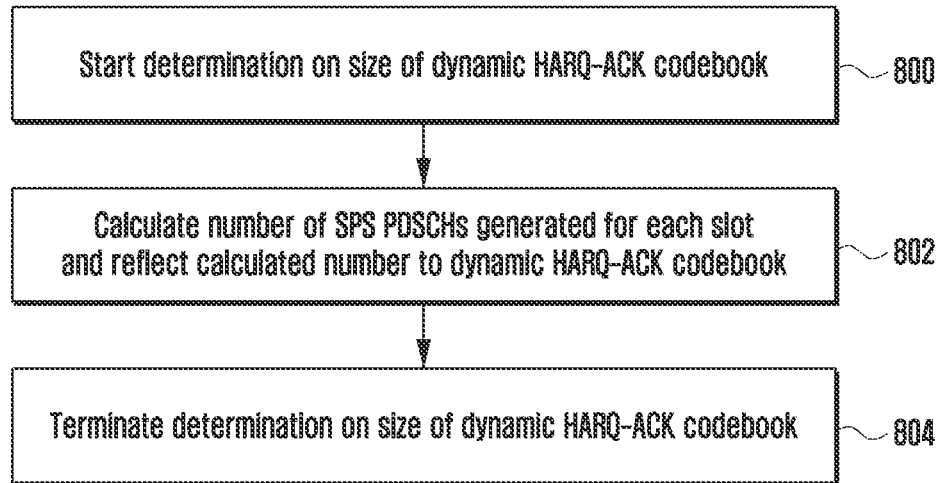
FIG. 8 is a block diagram illustrating a method in which a terminal determines a dynamic HARQ-ACK codebook for the reception of an SPS PDSCH according to an embodiment of the disclosure.

Alternative, the base station can previously configure two or more DL SPS transmission periods by using a higher signal, and can configure, as a pattern, the time difference between DL SPSs continuously transmitted. For example, a DL SPS transmission period having the intervals of two symbols and three symbols can be determined for a 2.5-symbol traffic pattern. Table 8 below is a table for the aperiodic DL SPS transmission period configuration. Z is a decimal having a value to one decimal place, and has a relationship represented by X<Z<X+1. For example, if Z is 3.2, X is 3. Gap 1 implies the symbol interval between the first SPS PDSCH resource received by the terminal after DCI indicating SPS activation is received, and the second SPS PDSCH resource. Gap 2 implies the symbol interval between the second SPS PDSCH resource and the third SPS PDSCH resource. That is, Gap i implies the symbol interval between the i-th SPS PDSCH resource and the (i+1)th SPS PDSCH resource. Configuration is a parameter for selecting one among various patterns, and FIG. 8 shows configurations having a total of nine patterns. The parameter may be provided to the terminal by a higher signal or an L1 signal, and the terminal may identify a DL SPS PDSCH transmission period pattern by a value indicated by the parameter. As another example, one value among the configurations can be implicitly determined according to a traffic generation period value. For example, when the base station and the terminal transmit or receive corresponding information by a higher signal configuration according to a 2.3-symbol traffic pattern, the base station and the terminal may determine that configuration 3 is applied.

TABLE 8

| Configuration | 1 | 2 | 3 | 4 | 5 | 6 | 7 | 8 | 9 |
|---|---|---|---|---|---|---|---|---|---|
| Gap 1 | X + 1 | X + 1 | X + 1 | X + 1 | X + 1 | X + 1 | X + 1 | X + 1 | X + 1 |
| Gap 2 | X | X | X | X | X | X + 1 | X + 1 | X + 1 | X + 1 |
| Gap 3 | X | X | X | X + 1 | X + 1 | X | X + 1 | X + 1 | X + 1 |
| Gap 4 | X | X | X + 1 | X | X | X + 1 | X | X + 1 | X + 1 |
| Gap 5 | X | X | X | X | X + 1 | X | X + 1 | X | X + 1 |
| Gap 6 | X | X + 1 | X | X + 1 | X | X + 1 | X + 1 | X + 1 | X + 1 |
| Gap 7 | X | X | X + 1 | X | X + 1 | X + 1 | X | X + 1 | X + 1 |
| Gap 8 | X | X | X | X + 1 | X | X | X + 1 | X + 1 | X + 1 |
| Gap 9 | X | X | X | X | X + 1 | X + 1 | X + 1 | X + 1 | X + 1 |
| Gap 10 | X | X | X | X | X | X | X | X | X | method 2-4-2: Method for Dynamically Changing a DL SPS transmission period.

method 2-4-2-1: transmission period information is included in DCI indicating DL SPS activation.

A DL SPS transmission period value is included in the information of DCI. The transmission period value is determined by previously configuring a set of candidate values through a higher signal, and selecting a particular value in the set through DCI. For example, a corresponding transmission period field of 1 bit is generated in DCI configured by transmission periods of {one slot, two slots} through a higher signal, and the 1 bit indicates whether the transmission period is one slot or two slots. That is, the number of DCI bits is determined according to a set of transmission periods configured by a higher signal, and if the number of sets is N, a total of ceil (log$_2$(N)) bits are configured in the DCI. The DCI may correspond to non-fallback DCI such as a DCI format 1_1. The corresponding field may exist or not in fallback DCI, such as a DCI format 1_0. Even in this case, fixed bit values and period values associated for each of the bit values may be applied.

method 2-4-2-2: Use of Existing Field In DCI Format Indicating DL SPS activation (1).

When one field in a DCI format indicating DL SPS activation indicates a particular value, a value of another field is used to indicate a transmission period without indicating an originally indicated value. For example, all bit values in a field indicating an HARQ process number indicate "1", a field indicating time resource information may be used to indicate one DL SPS transmission period among a set of DL SPS transmission periods previously configured by a higher signal.

method 2-4-2-3: Use of Existing Field In DCI Format Indicating DL SPS activation (2).

If a DCI format indicates DL SPS activation, it may be possible that a particular field in the DCI format always indicate a transmission period, or a particular value in a particular field in the DCI format indicates a transmission period. For example, if a time resource allocation field in a DCI format is verified as a format indicating SPS PDSCH activation, a base station determines the time resource allocation field to be used as a value indicating an SPS PDSCH transmission period rather than a value indicating the starting symbol and the length of an SPS PDSCH.

method 2-4-2-4: Configuration of search space-based implicit transmission period information A transmission period value is dynamically changed according to a search space in which DCI indicating DL SPS activation is transmitted. For example, a terminal may implicitly determine that DCI indicating DL SPS activation, which is transmitted to a common search space, has a transmission period of A, and DCI indicating DL SPS activation, which is transmitted to a UE specific search space, has a transmission period of B. The transmission period A and the transmission period B may be previously configured by the terminal through a higher signal.

method 2-4-2-5: Configuration of DCI format-based implicit transmission period information A transmission period value is dynamically changed according to a DCI format indicating DL SPS activation. For example, a terminal may implicitly determine that DCI indicating DL SPS activation, which is transmitted as a DCI format 1_0 that is fallback DCI, has a transmission period of A, and DCI indicating DL SPS activation, which is transmitted as a DCI format 1_1 that is non-fallback DCI, has a transmission period of B. The transmission period A and the transmission period B may be previously configured by the terminal through a higher signal.

In the disclosure, it is not expected that DL SPS PDSCH time resource information beyond a DL SPS transmission period is configured or indicated for a terminal. If a corresponding configuration or indication is received, the terminal considers the configuration or indication as an error and neglects the configuration or indication.

Figure 7:
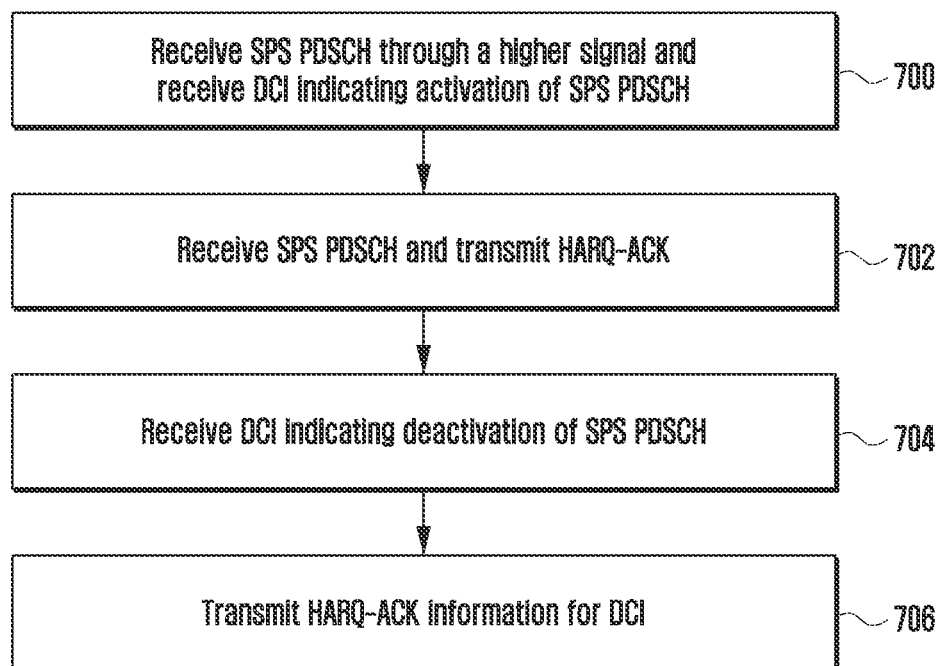
FIG. 7 is a block diagram illustrating a process in which a terminal transmits semi-static HARQ-ACK codebook-based HARQ-ACK information for downlink control information (DCI) indicating deactivation of an SPS physical downlink shared channel (PDSCH) according to an embodiment of the disclosure.

FIG. 7 is a block diagram illustrating a process in which a terminal transmits semi-static HARQ-ACK codebook-based HARQ-ACK information for DCI indicating deactivation of an SPS PDSCH according to an embodiment of the disclosure.

A terminal receives SPS PDSCH configuration information through a higher layer signaling. The information configured by the higher signal may include a transmission period, an MCS table, and HARQ-ACK configuration information. After the higher signal is received, the terminal receives DCI activating an SPS PDSCH from a base station at operation 700. After the DCI indicating activation is received, the terminal periodically receives the SPS PDSCH and transmits HARQ-ACK information corresponding thereto at operation 702. Thereafter, when the base station does not have downlink data to periodically transmit or receive any longer, the base station transmits DCI indicating deactivation of the SPS PDSCH to the terminal, and the terminal receives the DCI at operation 704. The terminal transmits HARQ-ACK information for the DCI indicating deactivation of the SPS PDSCH according to an SPS PDSCH transmission period at operation 706. For example, if the transmission period is larger than one slot, the terminal includes the HARQ-ACK information for the DCI indicating deactivation of the SPS PDSCH in an HARQ-ACK codebook position for HARQ-ACK information corresponding to the SPS PDSCH, and transmits the HARQ-ACK information. The HARQ-ACK information can be transmitted by at least one method among methods 2-1-1 or 2-1-2 illustrated in FIG. 6. If the transmission period is smaller than one slot, the terminal may transmit the HARQ- ACK information for the DCI information indicating deactivation of the SPS PDSCH by at least one method among methods 2-2-1 to 2-2-5.

Referring to FIG. 7, corresponds to an operation applied to a case where a semi-static HARQ-ACK codebook is previously configured by a base station for a terminal through a higher signal. In addition, the above descriptions in FIG. 7 may be limitedly applied to a case where a terminal is previously configured to be able to perform one HARQ-ACK transmission per slot by a higher signal, a protocol, or a UE capability.

FIG. 8 is a block diagram illustrating a method in which a terminal determines a dynamic HARQ-ACK codebook for the reception of an SPS PDSCH according to an embodiment of the disclosure.

Referring to FIG. 8, if a terminal is previously configured by a higher signal, to be operated with a dynamic HARQ-ACK codebook, the terminal starts to determine the size of an HARQ-ACK codebook for pieces of HARQ-ACK information to be transmitted in a particular slot at operation 800. The terminal not only determines the size of an HARQ-ACK codebook for a dynamically scheduled PDSCH, but also calculates the total number of SPS PDSCHs generated in a slot corresponding to a slot in which HARQ-ACK information is to be transmitted, and reflects the calculated value to the size of an HARQ-ACK codebook at operation 802. The terminal can configure a dynamic HARQ-ACK codebook by at least one of [pseudo-code 3] or [pseudo-code 4] illustrated with reference to FIG. 6. Thereafter, the terminal terminates the determination of the size of the HARQ-ACK codebook at operation 804, and transmits HARQ-ACK information in a corresponding slot. In addition, the above descriptions in FIG. 8 may be limitedly applied to a case where a terminal is previously configured to be able to perform one HARQ-ACK transmission per slot by a higher signal, a protocol, or a UE capability. For reference, in a case where one SPS PDSCH is repeatedly transmitted over a slot boundary as in the case 650 of FIG. 6, when a dynamic HARQ-ACK codebook is determined, the terminal determines the size of the HARQ-ACK codebook, based on a slot in which the SPS PDSCH is repeatedly transmitted for the last time. Specifically, in a case of slot k in the case 650 of FIG. 6, the SPS PDSCH 652 is transmitted, but does not count as a valid SPS PDSCH for determination of the size of a dynamic HARQ-ACK codebook. Instead, the terminal determines the size of a dynamic HARQ-ACK codebook for the SPS PDSCH 654 transmitted in slot k+1. In addition, in relation to the determination of the size of a dynamic HARQ-ACK codebook in a particular slot in [pseudo-code 4], when the number (k) of SPS PDSCHs per slot is determined, the number of valid SPS PDSCHs is calculated in a slot (or the ending slot) to which the ending symbol of the last SPS PDSCH among repeatedly transmitted SPS PDSCHs belongs.

Figure 9:
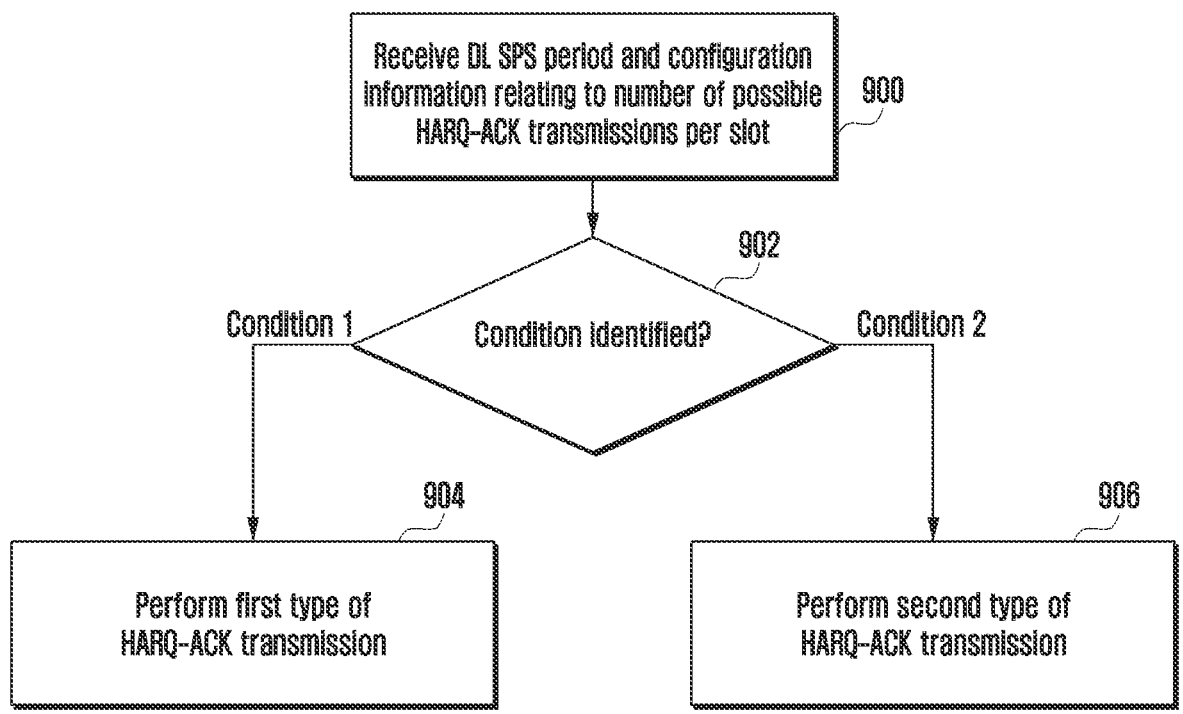
FIG. 9 is a block diagram illustrating a method in which a terminal transmits HARQ-ACK information according to a DL SPS transmission period according to an embodiment of the disclosure.

FIG. 9 is a block diagram illustrating a method in which a terminal transmits HARQ-ACK information according to a DL SPS transmission period according to an embodiment of the disclosure.

Referring to FIG. 9, a terminal may receive a DL SPS transmission period or configuration information relating to the maximum number of HARQ-ACK information transmissions per slot through a higher signal or an L1 signal at operation 900.

The terminal may check a condition relating to a DL SPS transmission period and HARQ-ACK information transmission per slot at operation 902.

If condition 1 is satisfied, the terminal may perform a first type of HARQ-ACK information transmission at operation 904.

If condition 2 is satisfied, the terminal may perform a second type of HARQ-ACK information transmission at operation 906.

Condition 1 may be the same as at least one of the following descriptions.
- the transmission period of a DL SPS PDSCH is larger than one slot
- only a maximum of one HARQ-ACK transmission per slot is possible Condition 2 may be the same as at least one of the following descriptions.
- the transmission period of a DL SPS PDSCH is smaller than one slot
- two or more HARQ-ACK transmissions per slot is possible In the first type of HARQ-ACK information transmission, the following fields may be included in a DCI format indicating the activation of a DL SPS PDSCH.
- PDSCH to HARQ-ACK feedback timing indicator: the indicator may indicate the slot interval between a slot transmitting HARQ-ACK information and a slot transmitting a PDSCH in units of slots. As in the case 650 of FIG. 6, one SPS PDSCH is repeatedly transmitted over a slot boundary, a basis slot of PDSCH transmission is a slot of an SPS PDSCH repeatedly transmitted for the last time.
- PUCCH resource indicator: the number of symbols, the starting symbol, a PRB index, a PUCCH format, etc.

Through the pieces of information, a PUCCH transmission resource through which HARQ-ACK information for a DL SPS PDSCH is to be transmitted, and a transmission format may be configured for the terminal. In addition, sets of the two field values may be previously configured by a higher signal, and one set among them may be selected based on DCI.

In the second type of HARQ-ACK information transmission, the following fields may be included in a DCI format indicating the activation of a DL SPS PDSCH.
- PDSCH to HARQ-ACK feedback timing indicator: indicating the interval between the ending symbol of a PDSCH and the starting symbol in which HARQ-ACK information starts to be transmitted in units of symbols.
- PUCCH resource indicator: the number of symbols, a PRB index, a PUCCH format, etc.

Through the pieces of information, a PUCCH transmission resource through which HARQ-ACK information for a DL SPS PDSCH is to be transmitted, and a transmission format may be configured for the terminal. In addition, a set of the two field values may be previously configured by a higher signal, and one set among them may be selected based on DCI.

Embodiment 4: Reception of DL SPS in Time Overlapped Situation

Figure 10:
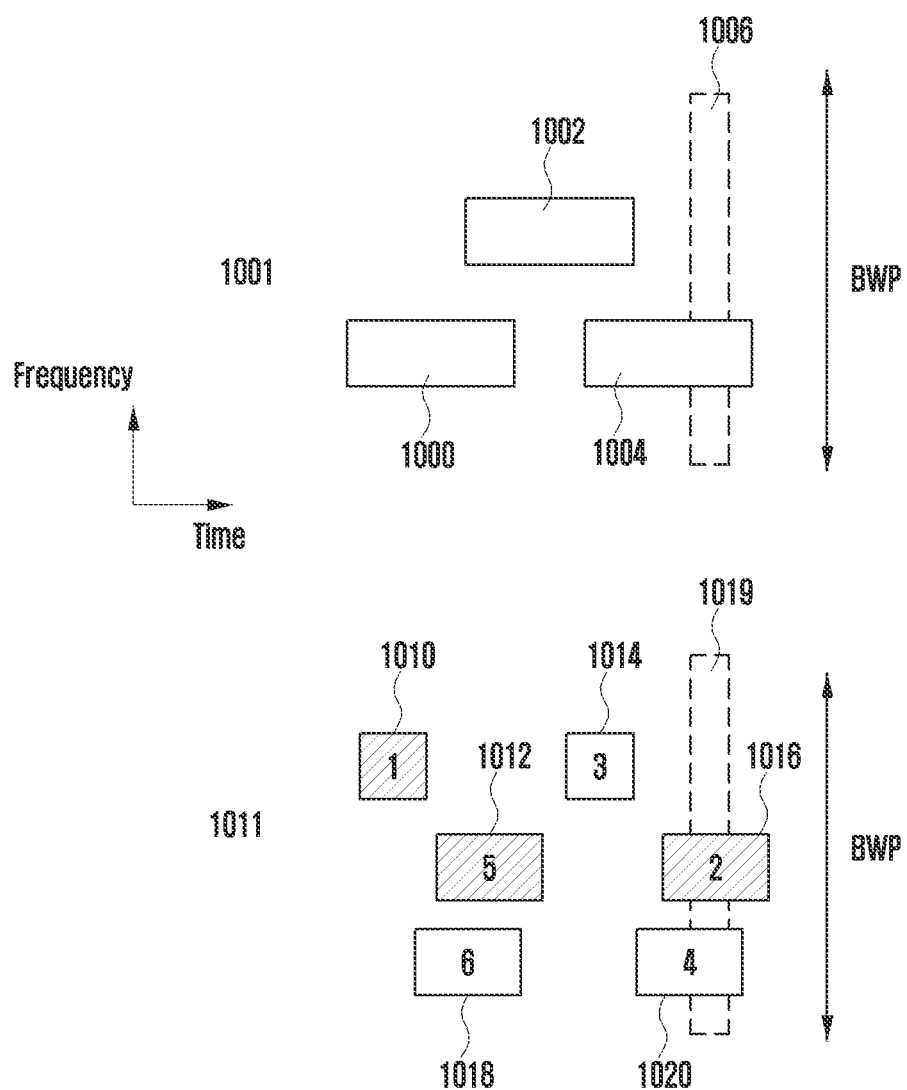
FIG. 10 is a diagram illustrating a DL SPS reception operation of a terminal in a situation where two or more DL SPSs overlap with each other in time resource according to an embodiment of the disclosure.

FIG. 10 is a diagram illustrating a DL SPS reception operation of a terminal in a situation where two or more DL SPSs overlap with each other in time resource according to an embodiment of the disclosure.

In the disclosure, the reception of DL SPS is described, but the disclosure can be applied to UL SPS in the same way. If the disclosure is applied to a UL SPS, a base station can perform transmission of configuration information and activation by DCI. However, an operation related to the reception of a TB in a time resource-overlapped situation may be performed by the base station rather than the terminal.

DL SPS has been described in the disclosure, but section 10.2 of 3GPP protocol TS38.213, section 5.3 of TS38.321, and section 6.3.2 of TS38.331 are also referred.

Referring to FIG. 10, a terminal can receive two or more different pieces of DL SPS higher signal configuration information in one activated BWP, and can activate them. In Rel-16 NR, a maximum of eight DL SPS configurations in one BWP is possible. The disclosure is not limited thereto, and can be applied to eight or more DL SPS configurations in a BWP. Different DL SPS PDSCHs (hereinafter, description for DL SPS) may be distinguished by index information previously configured/indicated by a higher signal or an L1 signal.

For example, the index information may be explicitly included in configuration information transmitted by a higher signal. The configuration information may include at least one of periodicity, nrofHARQ-Processes, n1PUCCH-AN, and mcs-Table information for each DL SPS configuration. In addition, index information for distinguishing between DL SPSs may be included.

As another example, the index information may be included in control information transmitted by a higher signal and/or an L1 signal. As another example, the index information may be implicitly configured. The index information may be configured to be sequentially increased according to a sequence in which DL SPS configuration information is included in configuration information transmitted by a higher signal.

As another example, the index information may be configured to be sequentially increased according to a sequence of activations caused by control information transmitted by an L1 signal after a higher configuration. If multiple DL SPSs are activated by pieces of control information, the index information may be increased according to a sequence in which the pieces of control information are included in a higher signal.

Moreover, a situation where two or more activated different DL SPS resources partially overlap with each other in terms of time resource may occur to the terminal. The above activation may imply a state where DL SPS is configured by a higher signal, a state where DL SPS is actually operated by an L1 message after being configured, or both of them. A time resource may be configured or allocated by information included in a higher signal, or may be configured or allocated by using information included in an L1 message or the transmission time point of the L1 message.

For example, referring to FIG. 10, if the transmission periods of two or more DL SPS resources are different from each other, the different DL SPS resources may overlap in a particular transmission interval or slot in terms of time resource.

The situation 1001 of FIG. 10 shows a situation where three different DL SPS resources overlap in time resource. If a terminal can receive only one DL SPS resource in one moment, the terminal receives only one DL SPS resource among the overlapped DL SPS resources. Therefore, there may be a method for randomly selecting, by the terminal, one among the overlapped DL SPS resources. However, in view of a base station, the base station does not know a DL SPS received by the terminal among the overlapped DL SPS resources, and whether the terminal has transmitted HARQ-ACK information for the DL SPS. Therefore, a DL SPS resource selecting method previously defined between the base station and the terminal is required. In order to solve the problem, at least one or multiple methods among the following methods can be applied in combination.

method 3-1: a method for prioritizing a DL SPS resource having the lowest index among time-overlapped DL SPS resources. For example, if a DL SPS resource having an index of 1 and a DL SPS resource having an index of 3 overlap with each other, the terminal receives a transport block (TB) transmitted from the base station, through the DL SPS resource having the index of 1, and does not receive a transport block through the DL SPS resource having the index of 3. Therefore, the terminal may perform demodulation/decoding for the TB received through the DL SPS resource having the index of 1, and transmit HARQ-ACK information therefor through a PUCCH resource previously configured for the DL SPS resource.

Even when three or more DL SPSs are time-overlapped, the terminal may receive a TB transmitted through a DL SPS resource having the lowest index value. As another example, in a situation where DL SPS resources are time-overlapped, the terminal may not receive a TB transmitted through a DL SPS resource except for the DL SPS resource having the lowest index value, or may be operated under an assumption that the base station does not transmit a TB through the DL SPS resource. For example, the terminal may not perform a demodulation/decoding operation on the corresponding DL SPS resource. As another example, the terminal may not transmit feedback information for the corresponding DL SPS resource, for example, ack/nack information.

method 3-2: a method for prioritizing a DL SPS resource having the highest index among time-overlapped DL SPS resources. For example, if a DL SPS resource having an index of 1 and a DL SPS resource having an index of 3 overlap with each other, the terminal receives a transport block (TB) transmitted from the base station, through the DL SPS resource having the index of 3, and does not receive the DL SPS resource having the index of 1. Therefore, the terminal may perform demodulation/decoding for the TB received through the DL SPS resource having the index of 3, and transmit HARQ-ACK information therefor through a PUCCH resource previously configured for the DL SPS resource.

Even when three or more DL SPSs are time-overlapped, the terminal may receive a TB transmitted through a DL SPS resource having the highest index value. As another example, in a time-overlapped situation, the terminal may not receive a TB transmitted through a DL SPS resource except for the DL SPS resource having the highest index value, or may be operated under an assumption that the base station does not transmit a TB through the DL SPS resource. For example, the terminal may not perform a demodulation/decoding operation on the corresponding DL SPS resource. As another example, the terminal may not transmit feedback information for the corresponding DL SPS resource, for example, ack/nack information.

method 3-3: a method for prioritizing a DL SPS in a time sequence in addition to method 3-1 (or method 3-2). In other words, method 3-3 is a method further including excluding a DL SPS resource already determined to have a low priority through an index comparison in a resource priority determination process, from a priority determination process with another resource overlapping with the DL SPS resource. The resource priority determination process may sequentially proceed according to a time sequence (or a reverse-time sequence in a particular time region). The particular time region may be a particular transmission interval or a slot.

Specifically, the terminal determines whether a resource of a DL SPS overlaps with a resource of another DL SPS according to a time sequence. If the resources overlap, the terminal may not perform a reception operation in a DL SPS resource having a low priority through an index comparison, or may assume that the base station has not transmitted a TB in the resource. In addition, the terminal may exclude a DL SPS having a low priority and overlapping in time resource, from a future operation of determining whether there is an overlap.

The situation 1001 of FIG. 10 shows a situation where three DL SPSs are differently overlapped with each other. If an index value configured for a DL SPS 1000 is 1, an index value configured for a DL SPS 1002 is 3, and an index value configured for a DL SPS 1004 is 5, the terminal does not receive the DL SPS 1004 because the index value is higher than that of the DL SPS 1002, and the terminal does not receive the DL SPS 1002 because the index value is higher than that of the DL SPS 1000, according to method 3-1. Therefore, although the DL SPS 1000 and the DL SPS 1004 are not time-overlapped with each other in the situation 1001 in FIG. 10, the terminal receives only the DL SPS 1000 by method 3-1. As in method 3-1, in a situation where the smaller the index, the higher the priority a DL SPS has, an operation in which the priority of a DL SPS resource is determined by only a resource configured for the DL SPS and index information, and the terminal receives a DL SPS having a high priority may be inefficient.

In order to solve the problem, method 3-3 may include: at a time point at which the terminal receives a real DL SPS, determining whether the DL SPS is time-overlapped with other valid DL SPSs; and if there is an overlap, not receiving a DL SPS(s) having a low priority and excluding the DL SPS having the low priority from a time overlap determination process. Thereafter, the terminal performs an operation of determining whether the DL SPS(s), which is not excluded from the DL SPS time overlap determination process, overlaps. Specifically, a method shown in Table 9 below may be applied.

may determine whether there is another DL SPS(s) which overlaps with the DL SPS. The DL SPS 1000 overlaps with the DL SPS 1002. Therefore, in operation 4, the terminal receives the DL SPS 1000 (having the index value of 1) having a high priority, and does not receive the DL SPS 1002 (having the index value of 3) having a low priority. The terminal determines that the DL SPS 1000 and the DL SPS 1002 are not valid DL SPSs, and proceeds with operation 1 to identify the next earliest DL SPS 1004. In operation 2, the terminal determines whether valid DL SPS resources overlapping with the DL SPS 1004 exist. The DL SPS 1002 is not a valid DL SPS resource any more. Therefore, the terminal determines that there is no overlapped resource, and then proceeds with operation 3. The terminal receives the DL SPS 1004. Method 3-2 can be also applied in the same way. Moreover, if an operation for DL SPS is applied by considering a time sequence from the earliest DL SPS to the latest in Table 9, and the reverse sequence is also possible.

method 3-4: a method for determining a priority by considering a time resource to which a DL SPS is assigned, in addition to 3-1 (or method 3-2). In other words, method 3-3 is a method further including: excluding a DL SPS resource already determined to have a low priority through an index comparison in a resource priority determination process, from a priority determination process with another resource overlapping with the DL SPS resource. The resource priority determination process may sequentially proceed from a DL SPS having a low index in a particular time region (or from a DL SPS having a high index). The particular time region may be a particular transmission interval or a slot.

Specifically, the terminal determines whether a resource of a DL SPS overlaps with a resource of another DL SPS according to the ascending order of index in a particular time region. If the resources overlap, the terminal may not perform a reception operation in a DL SPS resource having a low priority through an index comparison, or may assume that the base station has not transmitted a TB in the resource. In addition, the terminal may exclude a DL SPS having a low priority and overlapping in time resource, from a future operation of determining whether there is an overlap.

TABLE 9

Operation 1: identifying a DL SPS transmission resource that is valid and activated in a particular transmission interval or slot, and if there are no more valid and activated DL SPS transmission resources, ending the method.
Operation 2: checking whether there is another DL SPS resource that is time-overlapped with the first scheduled DL SPS among the valid and activated DL SPS transmission resource(s) identified in operation 1.
Operation 3: if there is no overlapped resource in operation 2, the terminal receives the first scheduled DL SPS, considers the corresponding DL SPS as a DL SPS resource that is not valid, and proceeds with operation 1.
Operation 4: if there is an overlap in operation 3, receiving a DL SPS transmission resource having the highest DL SPS priority among overlapped DL SPS transmission resources, not receiving the other DL SPS transmission resources, considering all the overlapped DL SPS resource as invalid DL SPS resources, and proceeding with operation 1.

A method as described above will be described with reference to the situation 1001 in FIG. 10. If an index value configured for a DL SPS 1000 is 1, an index value configured for a DL SPS 1002 is 3, and an index value configured for a DL SPS 1004 is 5, the terminal determines all the DL SPS resources 1000, 1002, and 1004 activated in a particular transmission interval or slot, as valid DL SPS resources, in operation 1. In operation 2, before the DL SPS 1000 that is scheduled first in a time sequence is received, the terminal Considering method 3-3, in the situation 1001 in FIG. 10, if an index value configured for a DL SPS 1000 is 5, an index value configured for a DL SPS 1002 is 3, and an index value configured for a DL SPS 1004 is 1, the terminal may not receive the DL SPS 1004, and receive the DL SPS 1002 although the DL SPS overlaps with the DL SPS 1004 and the priority thereof is low. Therefore, considering in a time sequence may cause a problem. Therefore, by considering a time resource region to which all DL SPSs activated in a particular transmission interval or slot are allocated, the terminal may exclude DL SPSs, at least one symbol of which is overlapped with DL SPS (A) in view of a time resource, which is the highest priority, and determine to receive DL SPS (A) having the highest priority. The terminal may exclude DL SPSs, at least one symbol of which is overlapped with DL SPS (B) resource in view of a time resource, which is the highest priority among the remaining DL SPS resources which are not excluded, and determine to receive DL SPS (B). The terminal may continue to perform the above operations until DL SPSs that are not determined to be received, or are not excluded do not exist anymore. The terminal may receive data of DL SPSs determined in the particular interval or slot, and transmit HARQ-ACK information for the data to the base station. In addition, a method shown in Table 10 below may be applied.

TABLE 10 operation 1: identifying a DL SPS transmission resource determined to be received or not to be received, among DL SPS resources activated in a particular transmission interval or slot; and if there is at least one DL SPS transmission resource that has not been determined to be received or not to be received, proceeding with operation 2, and otherwise, proceeding with operation 3.
Operation 2: determining to receive a DL SPS resource having the highest priority among DL SPS transmission resources that has not been determined to be received or not to be received, in operation 1; and determining that the terminal does not receive DL SPS resources, one or more symbols of which are overlapped with the DL SPS resource, and proceeding with operation 1.
Operation 3: the terminal receives DL SPS resources determined to be received, and reports HARQ-ACK information for the resources to the base station; and the terminal does not receive DL SPS resources determined not to be received.

A more detailed description will be given with reference to the situation 1011 of FIG. 10. Referring to the situation 1011, a situation where DL SPSs 1010, 1012, 1014, 1016, 1018, and 1020 having six different indexes are activated, and are scheduled in one slot is illustrated. If a DL SPS having a low index value has a high priority, a terminal receives the DL SPS 1010 having an index of 1, and does not receive the DL SPS 1018 having an index of 6 and overlapping with the DL SPS 1010 according to method 3-4. The terminal receives the DL SPS 1016 having an index of 2, which indicates the next highest priority, and does not receive the DL SPS 1014 having an index of 3 and the DL SPS 1020 having an index of 4, the DL SPSs overlapping with the DL SPS 1016. The terminal receives the DL SPS 1012 having an index of 5, which indicates the next highest priority. Therefore, the terminal eventually receives the DL SPSs 1010, 1012, and 1016, demodulates/decodes the DL SPSs, and then reports HARQ-ACK information for the DL SPSs to the base station.

method 3-5: a method for, in a TDD situation of method 3-3 or 3-4, determining a priority by considering symbol orientation information in a particular transmission interval or slot. A symbol orientation may be one among the downlink, the uplink, and Flexible. In a TDD situation, a method for indicating symbol orientation information refers to section 11.1 of 3GPP protocol TS 38.213. Fundamentally, only in a case where all the symbols of a resource region to which a DL SPS is allocated are indicated to be the downlink (DL) by a higher or L1 signal, the terminal may receive data. If at least one symbol in a resource to which a DL SPS is allocated is configured/indicated to be an uplink symbol or a flexible symbol by a higher or L1 signal, the terminal may not receive the DL SPS. Therefore, considering the above description, method 3-3 or 3-4 can be considered. In a case of method 3-3, the following conditions may be added to Table 9.

only in a case where all transmission resources of DL SPSs are indicated to be the downlink by a higher or L1 signal, the resources are considered as valid DL SPS resources. Alternatively, DL SPS resources, at least one symbol of which is overlapped with a symbol configured/indicated to be an uplink symbol or a flexible symbol by a higher or L1 signal, are considered to be invalid, and the terminal does not receive the DL SPS resources. In the situation 1001 of FIG. 10, the DL SPS 1004 overlaps with a symbol 1006 configured/indicated to be an uplink symbol or a flexible symbol by a higher or L1 signal, and thus the terminal does not receive the DL SPS 1004.

In other words, before method 3-3 is performed, the terminal determines whether each of DL SPSs overlaps with an uplink symbol or a flexible symbol. The terminal operates on an assumption that the terminal and does not receive a TB and the base station has not transmitted the TB in an overlapped DL SPS resource. Thereafter, before method 3-3 is performed, the terminal excludes a corresponding DL SPS from a priority determination process.

In a case of method 3-4, the following conditions may be added to Table 10.

the terminal determines not to receive DL SPS resources, at least one symbol of which is overlapped with a symbol configured/indicated to be an uplink symbol or a flexible symbol by a higher or L1 signal. In the situation 1011 of FIG. 10, the DL SPSs 1016 and 1020 overlap with a symbol 1019 configured/indicated to be an uplink or flexible symbol by a higher or L1 signal, and thus the terminal may not receive the DL SPSs 1016 and 1020. Therefore, in this case, the terminal receives the DL SPSs 1010, 1012, and 1014, and then reports HARQ-ACK information for the DL SPSs, according to method 3-4. The terminal does not receive the DL SPSs 1018, 1016, and 1020 according to methods 3-4 and 3-5.

In other words, before method 3-4 is performed, the terminal determines whether each of DL SPSs overlaps with an uplink symbol or a flexible symbol. The terminal is operated under an assumption that there is no reception in an overlapped DL SPS resource, or the base station has not transmitted a TB therein. Thereafter, before method 3-4 is performed, the terminal excludes a corresponding DL SPS from a priority determination process.

Figure 11:
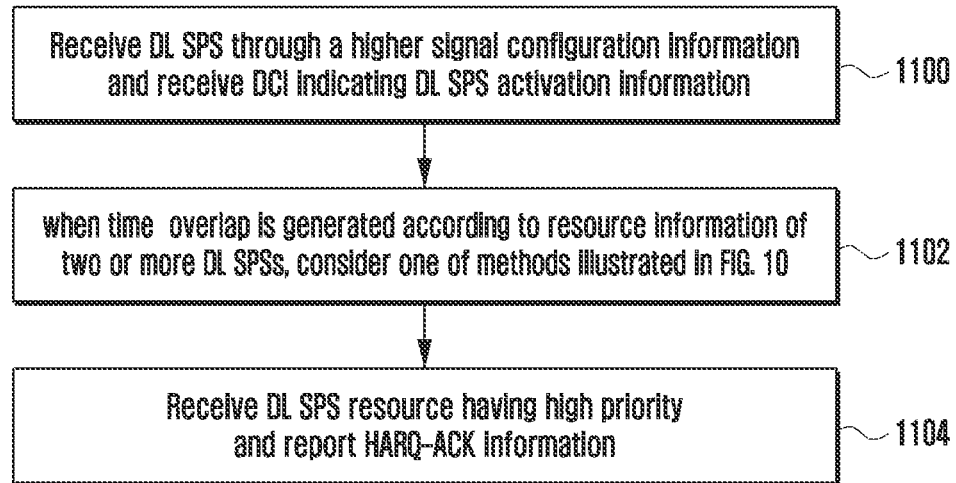
FIG. 11 is a block diagram illustrating a reception operation of a terminal in a situation where two or more DL SPSs overlap with each other in time resource according to an embodiment of the disclosure.

FIG. 11 is a block diagram illustrating a reception operation of a terminal in a situation where two or more DL SPSs overlap with each other in time resource according to an embodiment of the disclosure.

Referring to FIG. 11, a terminal may previously receive pieces of DL SPS configuration information through a higher signal (RRC) (operation 1100). The terminal may receive pieces of index information for the DL SPS together, or the pieces of index information for the DL SPS may be indirectly configured.

The pieces of DL SPS configuration information configured by higher signaling may be activated individually or in group by DCI including a CRC scrambled by a CS-RNTI at operation 1100. The DL SPS may be activated by only receiving configuration information of a higher signal, and in this case, the reception of DCI including a CRC scrambled by a CS-RNTI may be omitted.

The terminal periodically receives information in a resource previously configured through each of the pieces of DL SPS configuration information. If two or more DL SPSs having different indexes are time-overlapped, the terminal may consider or perform at least one of the methods (methods 3-1 to 3-5) illustrated in FIG. 10 at operation 1102. Accordingly, the terminal may receive only a DL SPS having a high priority (e.g. the lowest index value), and report HARQ-ACK information for the DL SPS at operation 1104. However, the terminal may not receive DL SPSs having a low priority (e.g. a high index value), and may not report HARQ-ACK information or not generate HARQ-ACK information itself. If the terminal receives two or more DL SPS resources in one slot, the terminal can use one of the following two methods when an HARQ-ACK codebook is configured.

- method 4-1: the terminal may sequentially map pieces of HARQ-ACK information from a piece of HARQ-ACK information for a DL SPS resource having the lowest index. For example, if the terminal receives a DL SPS having an index of 1, a DL SPS having an index of 3, and a DL SPS having an index of 5 in one slot, the terminal may configure an HARQ-ACK codebook to include [HARQ-ACK information for DL SPS index 1, HARQ-ACK information for DL SPS index 3, HARQ-ACK information for DL SPS index 5].
- method 4-2: the terminal may sequentially map pieces of HARQ-ACK information from a piece of HARQ-ACK information for the first received DL SPS by considering a time resource region of DL SPSs actually received by the terminal in a slot. For example, if the terminal receives a DL SPS having an index of 1 in symbols 1-3, a DL SPS having an index of 3 in symbols 10 and 11, and a DL SPS having an index of 5 in symbols 4-6, the terminal may configure an HARQ-ACK codebook to include [HARQ-ACK information for DL SPS index 1, HARQ-ACK information for DL SPS index 5, HARQ-ACK information for DL SPS index 3] in view of a time resource in which an SPS PDSCH is actually transmitted or received. The terminal uses a time domain resource allocation (TDRA) value applied when activating a DL SPS. That is, the terminal generates an HARQ-ACK codebook of DL SPSs received in one slot by referring to a TDRA value of the DL SPSs from section 9.1.2 of 3GPP protocol TS 38.213.

Figure 12:
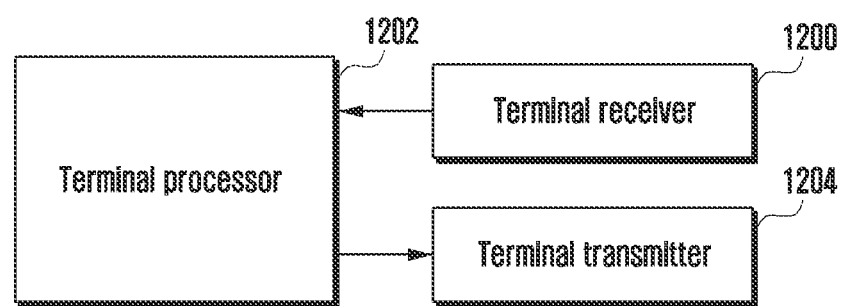
FIG. 12 is a block diagram illustrating a structure of a terminal capable of performing according to an embodiment of the disclosure.

FIG. 12 is a block diagram illustrating a structure of a terminal capable of performing according to an embodiment of the disclosure.

Referring to FIG. 12, a terminal of the disclosure may include a terminal receiver 1200, a terminal transmitter 1204, and a terminal processor 1202. The terminal receiver 1200 and the terminal transmitter 1204 may be collectively referred to as a transceiver in an embodiment. The transceiver may transmit or receive a signal to or from a base station. The signal may include control information and data. To this end, the transceiver may include an RF transmitter that up-converts and amplifies a frequency of a transmitted signal, an RF receiver that low-noise amplifies a received signal and down-converts the frequency, and the like. In addition, the transceiver may receive a signal through a wireless channel and output the signal to the terminal processor 1202, and may transmit a signal output from the terminal processor 1202, through a wireless channel. The terminal processor 1202 may control a series of processes so that the terminal can operate according to embodiments described above.

Figure 13:
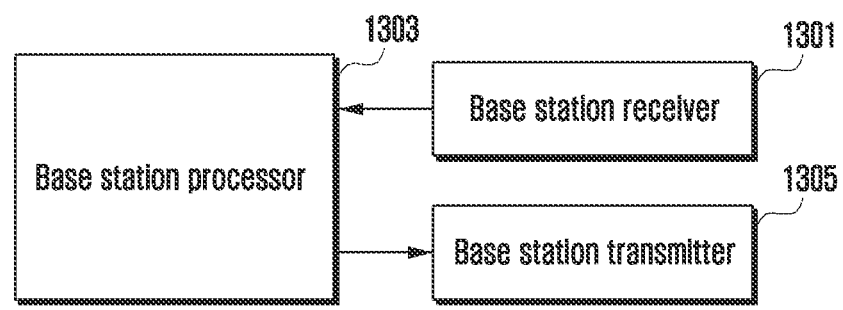
FIG. 13 is a block diagram illustrating a structure of a base station capable of performing according to an embodiment of the disclosure.

FIG. 13 is a block diagram illustrating a structure of a base station capable of performing according to an embodiment of the disclosure.

Referring to FIG. 13, in an embodiment, a base station may include at least one of a base station receiver 1301, a base station transmitter 1305, and a base station processor 1303. The base station receiver 1301 and the base station transmitter 1305 may be collectively referred to as a transceiver in an embodiment. The transceiver may transmit or receive a signal to or from a terminal. The signal may include control information and data. To this end, the transceiver may include an RF transmitter that up-converts and amplifies a frequency of a transmitted signal, an RF receiver that low-noise amplifies a received signal and down-converts the frequency, and the like. In addition, the transceiver may receive a signal through a wireless channel and output the signal to the base station processor 1303, and may transmit a signal output from the base station processor 1303, through a wireless channel. The base station processor 1303 may control a series of processes so that the base station can operate according to embodiments described above.

In the drawings in which methods of the disclosure are described, the order of the description does not always correspond to the order in which operations of each method are performed, and the order relationship between the operations may be changed or the operations may be performed in parallel. Alternatively, in the drawings in which methods of the disclosure are described, some elements may be omitted and only some elements may be included therein without departing from the essential spirit and scope of the disclosure.

In the disclosure, a terminal operation for an SPS PDSCH has been mainly described. However, the disclosure can be sufficiently and equivalently applied to a grant-free PUSCH (or configured grant type 1 and type 2).

Further, in methods of the disclosure, some or all of the contents of each embodiment may be combined without departing from the essential spirit and scope of the disclosure.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, a plurality of embodiments of the disclosure may be partially combined to operate a base station and a terminal. Further, although the above embodiments have been described by way of the NR system, other variants based on the technical idea of the embodiments may be implemented in other systems such as FDD or TDD LTE systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
  receiving, from a base station, a semi-persistent scheduling (SPS) configuration including an SPS configuration index; and
  in case that at least two physical downlink shared channels (PDSCHs) associated with the SPS configuration are in a slot:
    performing reception of a PDSCH with a lowest SPS configuration index based on the SPS configuration index,
    performing exclusion of the received PDSCH and at least one PDSCH that is overlapped with the received PDSCH from a set of PDSCHs within the slot, and
    until the set of the PDSCHs is empty, repeating the reception and the exclusion.

2. The method of claim 1, wherein the SPS configuration further includes at least one of a periodicity, a number of hybrid automatic repeat request (HARQ) processes, a HARQ resource for a physical uplink control channel (PUCCH) for downlink SPS, or a modulation and coding scheme (MCS) table.

3. The method of claim 1, further comprising:
  transmitting, to the base station, HARQ information for the received PDSCH among the set of the PDSCHs.

4. The method of claim 1, further comprising:
  receiving, from the base station, downlink control information (DCI) including SPS activation information,
  wherein the SPS configuration is received through higher layer signaling.

5. A method performed by a base station in a communication system, the method comprising:
  transmitting, to a terminal, a semi-persistent scheduling (SPS) configuration including an SPS configuration index; and
  in case that at least two physical downlink shared channels (PDSCHs) associated with the SPS configuration are in a slot:
    performing transmission of a PDSCH with a lowest SPS configuration index based on the SPS configuration index,
    performing exclusion of the transmitted PDSCH and at least one PDSCH that is overlapped with the transmitted PDSCH from a set of PDSCHs within the slot, and
    until the set of the PDSCHs is empty, repeating the transmission and the exclusion.

6. The method of claim 5, wherein the SPS configuration further includes at least one of a periodicity, a number of hybrid automatic repeat request (HARQ) processes, a HARQ resource for a physical uplink control channel (PUCCH) for downlink SPS, or a modulation and coding scheme (MCS) table.

7. The method of claim 5, further comprising:
  receiving, from the terminal, HARQ information for the transmitted PDSCH among the set of the PDSCHs.

8. The method of claim 6, further comprising:
  transmitting, to the terminal, downlink control information (DCI) including SPS activation information,
  wherein the SPS configuration is transmitted through higher layer signaling.

9. A terminal in a communication system, the terminal comprising:
  a transceiver; and
  a controller coupled with the transceiver and configured to:
    receive, from a base station, a semi-persistent scheduling (SPS) configuration including an SPS configuration index, and
    in case that at least two physical downlink shared channels (PDSCHs) associated with the SPS configuration are in a slot:
      perform reception of a PDSCH with a lowest SPS configuration index based on the SPS configuration index,
      perform exclusion of the received PDSCH and at least one PDSCH that is overlapped with the received PDSCH from a set of PDSCHs within the slot, and
      until the set of the PDSCHs is empty, repeat the reception and the exclusion.

10. The terminal of claim 9, wherein the SPS configuration further includes at least one of a periodicity, a number of hybrid automatic repeat request (HARQ) processes, a HARQ resource for a physical uplink control channel (PUCCH) for downlink SPS, or a modulation and coding scheme (MCS) table.

11. The terminal of claim 9, wherein the controller is further configured to transmit, to the base station, HARQ information for the received PDSCH among the set of the PDSCHs.

12. The terminal of claim 9,
  wherein the controller is further configured to:
    receive, from the base station, downlink control information (DCI) including SPS activation information, and
  wherein the SPS configuration is received through higher layer signaling.

13. A base station in a communication system, the base station comprising:
  a transceiver; and
  a controller coupled with the transceiver and configured to:
    transmit, to a terminal, a semi-persistent scheduling (SPS) configuration including an SPS configuration index, and
    in case that at least two physical downlink shared channels (PDSCHs) associated with the SPS configuration are in a slot:
      perform transmission of a PDSCH with a lowest SPS configuration index based on the SPS configuration index,
      perform exclusion of the transmitted PDSCH and at least one PDSCH that is overlapped with the transmitted PDSCH from a set of PDSCHs within the slot, and
      until the set of the PDSCHs is empty, repeat the transmission and the exclusion.

14. The base station of claim 13, wherein the SPS configuration further includes at least one of a periodicity, a number of hybrid automatic repeat request (HARQ) processes, a HARQ resource for a physical uplink control channel (PUCCH) for downlink SPS, or a modulation and coding scheme (MCS) table.

15. The base station of claim 13, wherein the controller is further configured to receive, from the terminal, HARQ information for the transmitted PDSCH among the set of the PDSCHs.

16. The base station of claim 13,
wherein the controller is further configured to transmit, to the terminal, downlink control information (DCI) including SPS activation information, and
wherein the SPS configuration is transmitted through higher layer signaling.

* * * * *